United States Patent
Green et al.

(10) Patent No.: US 12,398,670 B2
(45) Date of Patent: Aug. 26, 2025

(54) ROTATING INTERNAL COMBUSTION ENGINE

(71) Applicants: Charles Mattison Green, Cypress, TX (US); Grant O. Musgrove, San Antonio, TX (US); Kevin L. Hoag, San Antonio, TX (US); David P. Branyon, San Antonio, TX (US); Thomas E. Reinhart, Fair Oaks Ranch, TX (US)

(72) Inventors: Charles Mattison Green, Cypress, TX (US); Grant O. Musgrove, San Antonio, TX (US); Kevin L. Hoag, San Antonio, TX (US); David P. Branyon, San Antonio, TX (US); Thomas E. Reinhart, Fair Oaks Ranch, TX (US)

(73) Assignee: Green Engine, LLC, Cypress, TX (US)

( * ) Notice: Subject to any disclaimer, the term of this patent is extended or adjusted under 35 U.S.C. 154(b) by 124 days.

(21) Appl. No.: 16/795,990

(22) Filed: Feb. 20, 2020

(65) Prior Publication Data
US 2020/0271047 A1    Aug. 27, 2020

Related U.S. Application Data

(60) Provisional application No. 62/808,174, filed on Feb. 20, 2019.

(51) Int. Cl.
*F02C 5/12*    (2006.01)
*F02C 3/16*    (2006.01)
(Continued)

(52) U.S. Cl.
CPC .............. *F02C 5/12* (2013.01); *F02C 3/165* (2013.01); *F02C 5/04* (2013.01); *F02C 6/20* (2013.01); *F23R 3/56* (2013.01)

(58) Field of Classification Search
CPC .... F02C 3/165; F02C 5/04; F02K 7/06; F02K 7/005
(Continued)

(56) References Cited

U.S. PATENT DOCUMENTS 1,319,752 A * 10/1919 Brown .................. F02C 5/04
                                           60/39.5
2,395,404 A *  2/1946 Goddard .............. F02K 7/005
                                           60/224
(Continued)

FOREIGN PATENT DOCUMENTS

JP    2010138710 A    6/2010
KR    20160028267 A   3/2016

OTHER PUBLICATIONS

International Preliminary Report on Patentability issued in PCT Application No. PCT/US2020/019026, mailed Sep. 2, 2021; 6 pages.
(Continued)

*Primary Examiner* — Ted Kim
(74) *Attorney, Agent, or Firm* — Michael S. McCoy; Amatong McCoy LLC

(57) ABSTRACT

A rotating internal combustion engine is provided. The engine includes a drive shaft and a rotatable cylinder coupled with the drive shaft. Combustion chambers are formed through the rotatable cylinder. The combustion chambers are defined by combustion blades of the rotatable cylinder. The engine is configured to generate power from combustion of the gases and from turbine movement caused from the combustion gases. Also disclosed is a fixed cylinder combustion engine.

19 Claims, 14 Drawing Sheets

(51) Int. Cl.
*F02C 5/04* (2006.01)
*F02C 6/20* (2006.01)
*F23R 3/56* (2006.01)

(58) Field of Classification Search
USPC .................................................. 60/39.34, 735
See application file for complete search history.

(56) References Cited

U.S. PATENT DOCUMENTS

| | | | |
|---|---|---|---|
| 2,705,867 A | 4/1955 | Lewis | |
| 3,321,911 A * | 5/1967 | Tommie | F02C 3/165 60/39.35 |
| 3,417,564 A * | 12/1968 | Call | F02C 5/12 60/39.34 |
| 3,639,076 A * | 2/1972 | Rowen | F02C 9/32 416/30 |
| 3,771,311 A * | 11/1973 | Herbst | F02C 6/20 60/39.281 |
| 3,811,275 A * | 5/1974 | Mastrobuono | F02C 5/04 60/39.34 |
| 4,232,515 A * | 11/1980 | Brown | F02C 9/44 244/46 |
| 4,620,414 A * | 11/1986 | Christ | F02C 5/04 60/805 |
| 5,372,005 A * | 12/1994 | Lawler | F02C 3/165 60/39.35 |
| 6,460,342 B1 | 10/2002 | Nalim | |
| 7,278,256 B2 * | 10/2007 | Norris | F23R 7/00 60/39.34 |
| 8,443,583 B2 * | 5/2013 | Nalim | F23R 7/00 60/39.38 |
| 2005/0019620 A1 * | 1/2005 | Schick | F02C 5/00 429/429 |
| 2005/0210879 A1 * | 9/2005 | Murayama | F02C 3/28 60/776 |
| 2011/0139116 A1 | 6/2011 | Herbruck | |
| 2012/0125006 A1 | 5/2012 | Saito et al. | |
| 2012/0216503 A1 | 8/2012 | Snyder | |
| 2014/0238037 A1 * | 8/2014 | Cummings, III | F02C 9/263 60/734 |
| 2014/0338358 A1 * | 11/2014 | Lee | F01L 5/045 60/776 |
| 2016/0194087 A1 | 7/2016 | Nalim | |
| 2016/0230656 A1 * | 8/2016 | Emmerson | F01N 13/1805 |
| 2017/0306846 A1 * | 10/2017 | Laing | F02C 7/18 |

OTHER PUBLICATIONS

Bryner, Elliott, Ph.D; Ransom, David, Pe; Bishop, John; Coogan, Shane; Musgrove; Grant, Design of a Small Scale Gas Turbine for a Hybrid Propulsion System, pp. 1-10, Proceedings of ASME Turbo Expo 2015: Turbine Technical Conference and Exposition, GT2015, Jun. 15-19, 2015, Montreal, Canada.

Coogan, Shane, Potential Benefits of Pressure Gain Combustion in Liquid Rocket Engine Pre-Burners, Jul. 27, 2015, pp. 1-11, American Institute of Aeronautics and Astronautics.

Dick, Erin, P&W Delivers F100-229 Engines to PAF, http://www.f-16.net/f-16-news-article3906.html, F-16.net The Ultimate F-16 Site, F-16 Fighting Falcon News, Nov. 16, 2009, 1 Page.

Falempin, F., Continuous Detonation Wave Engine, 2008, pp. 8-1 - 8-16 (16 Pages total), Von Karman Institute and RTO, with permission.

https://prattwhitney.com/products-and-services/products/commercial-engines/pw4000-94, Pratt & Whitney, PW4000-94 Engine, Accessed on Jul. 28, 2020, 8 Pages.

https://www.grc.nasa.gov/www/k-12/airplane/wrong1.html, National Aeronautics and Space Administration, Incorrect Lift Theory, Apr. 5, 2018, 3 Pages.

https://www.sr-71.org/photogallery/blackbird/j-58/, J58 Engine, SR-71 Online, Accessed on Jul. 28, 2020, 1 Page.

International Search Report and Written Opinion mailed May 19, 2020 (issued in PCT Application No. PCT/US2020/019026) [7 Pages].

Naples, Andrew; Hoke, John; Battelle, Ryan; Schauer, Fred; T63 Turbine Response to Rotating Detonation Combustor Exhaust Flow, Journal of Engineering for Gas Turbines and Power, Feb. 2019, pp. 021029-1-021029-8 (8 Pages total), vol. 141, ASME.

Paxson, Daniel E.; Fotia, Matthew L.; Hoke, John; Schauer, Fred; Comparison of Numerically Simulated and Experimentally Measured Performance of a Rotating Detonation Engine, Report, Aug. 2015, Cover Page, NASA STI Program Profile p. Title Page, Disclosure p. pp. 1-10, Blank p. Blank Page (16 p. total), National Aeronautics and Space Administration, Glen Research Center, Cleveland, Ohio.

Tian, Jibin; Fu, Tairan; Xu, Qiaoqi; Jiang, Hongde; Effective Spectral Emissivity of Gas Turbine Blades for Optical Pyrometry, Journal of Heat Transfer, Jul. 2017, pp. 072701-1-072701-6 (6 Pages total), vol. 139, ASME.

* cited by examiner

DIESEL CYCLE (ENGINE)

DETONATION CYCLE (GAS TURBINE)

OTTO CYCLE (ENGINE)

BRAYTON CYCLE (GAS TURBINE)

ROTATING INTERNAL COMBUSTION ENGINE

CROSS-REFERENCE TO RELATED APPLICATIONS

The present application claims the benefit of U.S. Provisional Patent Application No. 62/808,174 (pending), filed on Feb. 20, 2019, entitled "Air-Cooled, Rotating Internal Combustion Engine", the entirety of which is incorporated herein by reference.

FIELD

The present disclosure relates to systems, apparatus, and methods for generating motive power, including rotating internal combustion engines.

BACKGROUND

An internal combustion engine (ICE) works by combusting fuel in the presence of an oxidizer to form an expanding gas that, in-turn, applies force to a mechanical apparatus, typically pistons that move in response to the force, ultimately driving another mechanical apparatus (e.g., rotating the wheels of a vehicle). Such piston engines include four stages or strokes, including a loading stage, a compression stage, a detonation stage, and an exhaust stage.

Typical gas turbine engines have a section that is devoted only to combustion, which is positioned between a compressor section and a turbine section. The combustion process of such typical gas turbine engines occurs at constant pressure, where gas (e.g., air) continuously flows in from the compressor section into the combustion section, fuel is continuously added by injectors into the combustion section, and combustion occurs continuously in the combustion section.

BRIEF SUMMARY

One aspect of the present disclosure includes a combustion turbine engine. The engine includes an air intake and a combustion turbine. The combustion turbine includes a shroud and turbine blades coupled to or integral with the shroud. The turbine blades are positioned within the shroud, and space between adjacent turbine blades at least partially define combustion chambers, the combustion chambers having constant volumes. An intake end of the combustion turbine includes intake inlets into the combustion chambers, and an exhaust end of the combustion turbine includes exhaust outlets out of the combustion chambers. The engine includes a drive shaft coupled to the combustion turbine, such that rotation of the combustion turbine rotates the drive shaft. A top fixed plate of the engine includes intake inlets positioned adjacent the intake end, and a bottom fixed plate of the engine includes exhaust outlets positioned adjacent the exhaust end. The combustion turbine is positioned between the top and bottom fixed plates. The combustion turbine is rotatable relative to the top fixed plate to allow passage of intake air into the combustion chambers through the intake inlets, and is rotatable relative to the bottom fixed to exhaust combustion gases through the exhaust outlets.

Another embodiment of the present disclosure includes a combustion turbine engine that includes an air intake and a stationary combustor. The stationary combustor includes a shroud and combustion chamber walls coupled to or integral with the shroud. The combustion chamber walls are positioned within the shroud, and space between adjacent combustion chamber walls at least partially define combustion chambers. An intake end of the combustion chambers includes intake inlets into the combustion chambers, and an exhaust end of the combustion chambers includes exhaust outlets out of the combustion chambers. A top plate of the engine includes intake inlets positioned adjacent the intake end, and a bottom plate of the engine includes exhaust outlets positioned adjacent the exhaust end. The stationary combustor is positioned between the top and bottom plates. The top plate includes intake inlets, which may be nozzles, to direct intake air into the combustion chambers and the bottom plate includes exhaust outlets, which may be nozzles, positioned to direct exhaust out of the combustion chambers circumferentially about the stationary combustor to create thrust to rotate the top and bottom plates. A drive shaft is coupled with the top and bottom plates such that rotation of the top and bottom plates rotates the drive shaft. The top and bottom plates are rotatable relative to the stationary combustor to allow passage of intake air into the combustion chambers through the intake inlets and to exhaust combustion gases through the exhaust outlets.

Another embodiment of the present disclosure includes a method of generating motive force using a combustion turbine engine. The method includes providing fuel and intake air into an intake end of combustion chambers. The combustion chambers are at least partially defined by space between blades of a combustion turbine. The blades are coupled with a drive shaft. The method includes closing the intake end and exhaust end of the combustion chambers and combusting the fuel and intake air mixture within the closed, constant volume, combustion chambers. The combusting forms combustion gases. The method includes opening the exhaust end of the combustion chambers and exhausting the combustion gases from the combustion chambers. Without being bound by theory, using Newton's Third Law, the thrust from exhausting the combustion gases drives rotation of the blades, and rotation of the blades drives rotation of the drive shaft.

Another embodiment of the present disclosure includes a method of generating motive force using a combustion turbine engine. The method includes providing fuel and intake air into an intake end of combustion chambers. The combustion chambers are at least partially defined by space between blades of a stationary combustor. The method includes closing the intake end and exhaust end of the combustion chambers and combusting the fuel and intake air mixture within the closed combustion chambers. The combusting forms combustion gases. The method includes opening the exhaust end of the combustion chambers and exhausting the combustion gases from the combustion chambers. The stationary combustor is positioned between a top plate and a bottom plate of the combustion turbine engine. The top plate includes intake inlets positioned adjacent the intake end and the bottom plate includes exhaust outlets positioned adjacent the exhaust end. The top plate includes intake inlets, which may be nozzles, positioned to direct intake air into the combustion chambers and the bottom plate includes exhaust outlets, which may be nozzles, positioned to direct exhaust out of the combustion chambers circumferentially about the stationary combustor to create thrust to rotate the top and bottom plates. The top and bottom plates are coupled with a drive shaft such that rotation of the top and bottom plates rotates the drive shaft. The top and bottom plates are rotatable relative to the stationary combustor to allow passage of intake air into the combustion chambers through the intake inlets and to exhaust combustion gases through the exhaust outlets.

BRIEF DESCRIPTION OF THE DRAWINGS

So that the manner in which the features and advantages of the systems, apparatus, and/or methods of the present disclosure may be understood in more detail, a more particular description, briefly summarized above, may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

Systems, apparatus, and methods according to the present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include systems, apparatus, and methods for generating motive force. Some embodiments include a rotating internal combustion engine, which may be air-cooled, as well as to methods of making and using the same.

Engine Schematic

Figure 1A:
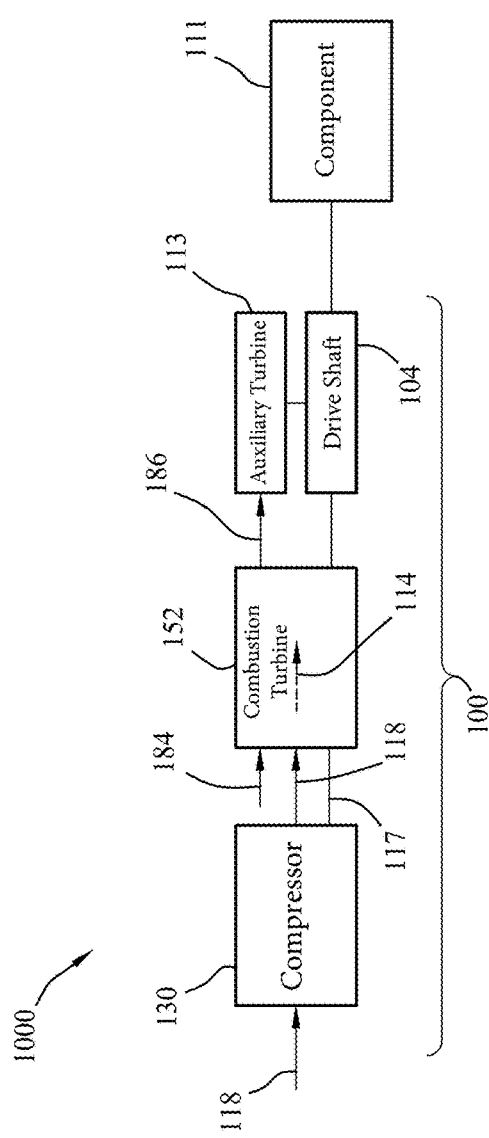
FIG. 1A is a schematic of a combustion turbine engine.

With reference to FIG. 1A, a system including an engine in accordance with some embodiments of the present disclosure is depicted. FIG. 1A is a schematic showing the relative arrangement and positioning of components in accordance with one embodiment. However, the systems and engines disclosed herein are not limited to the arrangement shown in FIG. 1A. System 1000 includes engine 100. The engines disclosed herein include a component that functions as both a combustion chamber for combustion of fuel and as a turbine for the harvesting of energy released during the combustion. In some embodiments, this component is referred to herein as a combustion turbine or as a rotating cylinder. Combustion turbine 152 may include one or more chambers within which combustion occurs. The chambers of combustion turbine 152 may be shaped and/or arranged to additionally function as turbine blades, such that fluids moving therein (e.g., expanding gases) impart force upon the walls of the combustion chambers (blades). For example, fuel mixture 114, such as a mixture of feed air 118 and gasoline 184, may be combusted within the constant volume combustion chambers of combustion turbine 152, forming combustion gases 186. The equal and opposite thrust force imparted by the exhaust of such fluids (combustion gases) onto the combustion chambers causes combustion turbine 152, or portions thereof, to rotate. As used herein, "constant volume" in reference to a combustion chamber refers to a combustion chamber that has a constant volume when combustion is occurring within the chamber. For example, a typical piston engine is not a constant volume combustion chamber because the volume of the combustion chamber changes with the movement of the piston. As used herein, "constant volume" in reference to a combustion process or event refers to the occurrence of combustion with a constant volume combustion chamber.

In some embodiments, combustion turbine 152 is coupled with drive shaft 104, such that rotation of combustion turbine 152 causes drive shaft 104 to rotate. Drive shaft 104 may, in turn, be coupled to another component 111, such that rotation of drive shaft 104 drives component 111, causing component 111 to rotate or otherwise move. For example, component 111 may be or include one or more wheels, fans, propellers, pumps, generators, or other devices in which the mechanical energy of rotating drive shaft 104 may be transferred, utilized, and/or converted. Thus, in some embodiments combustion turbine 152 drives the rotation of the wheels of a vehicle, drives the rotation of fans, drives the rotation of propellers of a vehicle (e.g., an airplane or boat), or drives a generator for the production of electricity. In some embodiments, combustion gases 186 exit combustion turbine 152, and at least some remaining energy of combustion gases 186 is harvested downstream of combustion turbine 152, such as via auxiliary turbine 113 or other rotation expander coupled with drive shaft 104. The energy harvested by auxiliary turbine 113 may be used to power other components of system 1000. For example, in some embodiments, air 118 is compressed prior to entering the combustion chambers of combustion turbine 152 via passage through at least one compressor 130, and the energy harvested by auxiliary turbine 113 is used to at least partially power the at least one compressor 130. As shown in FIG. 1A, compressor 130 is also coupled with combustion turbine 152, as indicated via 117, such that compressor 130 is capable of providing compressed air to combustion turbine 152. In some embodiments, the energy harvested by auxiliary turbine 113 is provided to compressor 130 as mechanical energy through drive shaft 104. In other embodiments, the energy harvested by auxiliary turbine 113 is converted to electrical energy prior to being provided to compressor 130. In FIG. 1A, engine 100 includes compressor 130, combustion turbine 152, auxiliary turbine 113, and drive shaft 104. However, engine 100 is not limited to including these components. In some embodiments, some of the components of engine 100 in FIG. 1A may be eliminated (e.g., the auxiliary turbine may be eliminated in some embodiments). Also, in some embodiments, additional components may be added to engine 100 (e.g., more than one compressor may be included upstream of combustion turbine 152).

Figure 1B:
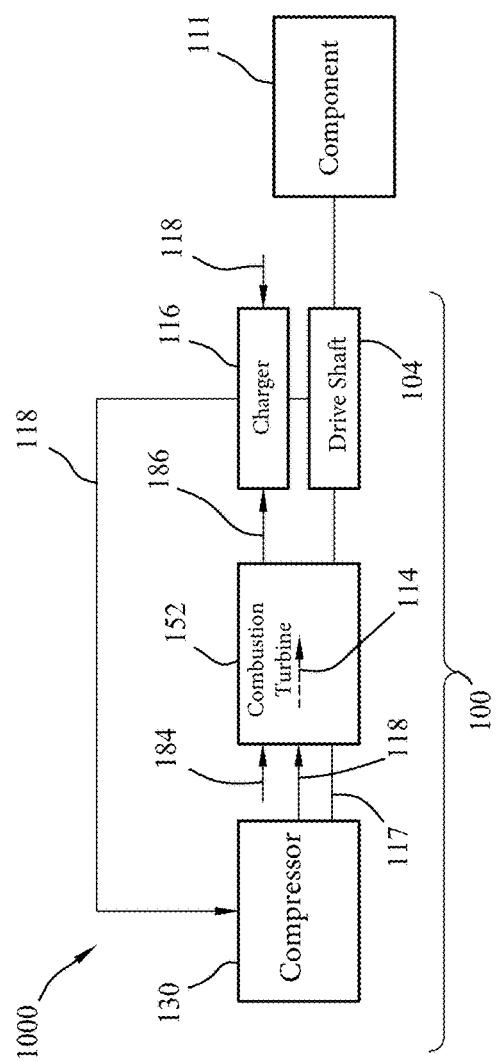
FIG. 1B is another schematic of a combustion turbine engine.

FIG. 1B depicts another embodiment of system 1000. System 1000 is substantially similar to the system of FIG. 1A. However, in FIG. 1B, air 118 first passes through charger 116, which may be a turbocharger, supercharger, or twincharger. Air 118 then flows from charger 116 to at least one compressor. The charger 116 may be driven, at least partially, by exhaust 186.

Engine Intake and Compression

Figure 2:
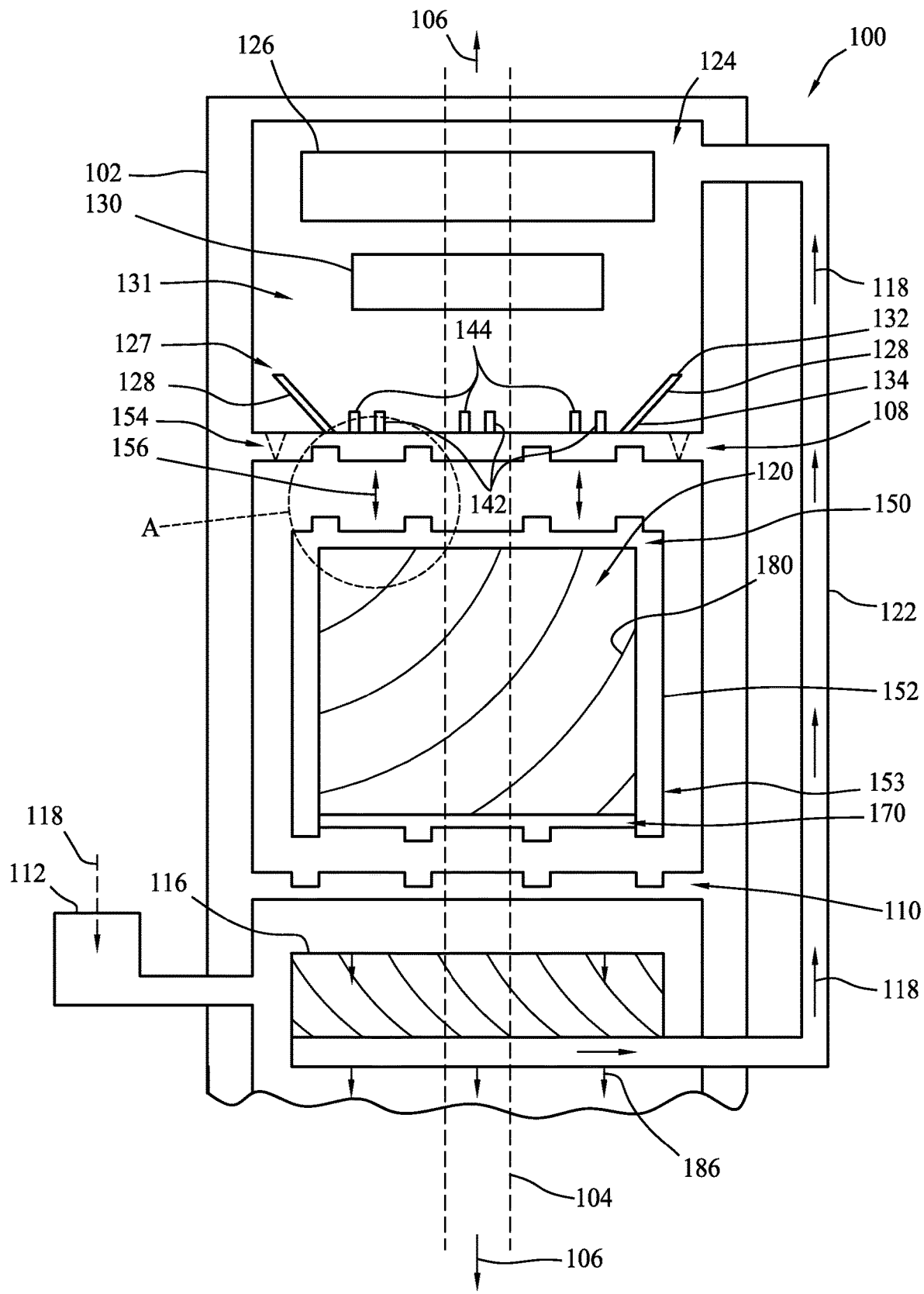
FIG. 2 depicts a combustion turbine engine

FIG. 2 depicts another embodiment of engine 100, including a turbocharger and two stages of compression, prior to combustion. Engine 100, also referred to as ICE, includes exterior cylinder 102, which at least partially defines a housing that contains all or at least some of the internal components of engine 100. Exterior cylinder 102 may be a relatively thick, heavy, metal cylinder that houses all or most of the internal components of engine 100. For example, external cylinder 102 may be at least partially composed of steel.

Moving along the fuel cycle of engine 100, from intake to exhaust, the operation of engine 100 will now be described. In some embodiments, the engines disclosed herein are naturally aerated. In other embodiments, the engines disclosed herein are forced induction engines that include a turbocharger, a supercharger, or a twincharger (i.e., a combination of a turbocharger and a twincharger) positioned to receive air and forcibly inject the air toward the combustion chamber of the engines, and into one or more compressors (e.g., compressors 126 and 130). For example, in FIG. 2, engine 100 includes forced induction device 116, which may be a turbocharger, a supercharger, or a twincharger. A turbocharger is a forced induction device that forces compressed air toward the combustion chamber of an engine. Turbochargers are powered by a turbine that is driven by the engine's exhaust gas. Thus, when forced induction device 116 is a turbocharger, forced induction device 116 may be positioned in the exhaust stream of the engine 100. A supercharger is a mechanically driven forced induction device, which may be mechanically driven by the engine, such as by a belt attached to the drive shaft of the engine. With reference to FIG. 2, engine 100 includes air inlet 112, through which air 118 enter into engine 100. Forced induction device 116, here shown as a turbocharger positioned within the exhaust stream of engine 100, receives air 118 from inlet 112. Forced induction device 116 forces air 118 towards the combustion chambers 120 of combustion turbine 152. While described as air, in some embodiments, engine 100 utilizes another oxidizer, such as pure oxygen.

From forced induction device 116, feed-air 118 passes through feed conduit 122 and into compression chamber 124, also referred to as feed chamber, of engine 100. Within compression chamber 124, feed-air 118 passes through a series of air-compressors, including first air compressor 126 and second air compressor 130. While air 118 is shown in FIG. 2 as passing through two sequential air compressors, engine 100 is not limited to including two sequential air compressors, and may include only one air compressor or more than two sequential air compressors. As air 118 enters compression chamber 124, air 118 passes through first air compressor 126. Within first air compressor 126 (also referred to as low-pressure air compressor) air is compressed, such that air 118 exiting first air compressor 126 is more compressed than air entering first air compressor 126. After exiting first air compressor 126, air 118 enters and is compressed within second air compressor 130 (also referred to as high-pressure air compressor). Within second air compressor 130, air is compressed, such that air 118 exiting second air compressor 130 is more compressed than air entering second air compressor 130. In some embodiments, one or more of the air compressors are coupled with and driven by drive shaft 104 of engine 100, such that rotation of drive shaft 104 drives the compressors. For example, a belt of other component may be coupled between drive shaft 104 and the compressors, such that the rotation of drive shaft 104 moves the belt and the movement of the belt drives the compressors.

From second air compressor 130, air 118 passes through air pressurization nozzle 127, which may be arranged concentrically within engine 100 relative to the outlet of compressor 130 and the intake inlet of combustion turbine 152. Air pressurization nozzle 127 may be integral with, attached to, or otherwise coupled with top fixed plate 108 of combustion turbine 152. Air pressurization nozzle 127 includes funnel wall 128, which may be a relatively short, angled wall. In some embodiments, funnel wall 128 does not engage external cylinder 102. From top end 132 of funnel wall 128 to top fixed plate 108, funnel wall 128 slants inward, at a slope relative to axis 106, such that bottom end 134 of funnel wall 128 defines an opening having a smaller diameter than the opening defined by top end 132 of funnel wall 128. Funnel wall 128 receives compressed feed-air 118 from high-pressure air-compressor 130, and funnels the compressed feed-air 118 into the combustion chambers 120. Air pressurization nozzle 127 further compresses feed-air 118 before feed-air 118 flows into the inlet openings on top fixed plate 108. In some embodiments, the bottom end 134 of funnel wall 128 is coupled with top fixed plate 108 at a location in the outer one-third of top fixed plate 108 (i.e., is positioned closer to the circumferential perimeter of top fixed plate 108 than to a center point of top fixed plate 108).

Combustion Turbine Engine

With reference to FIGS. 2, 3, 4, and 5, the intake end of combustion turbine 152 is described. The present disclosure includes combustion turbine engines that are piston-less, i.e., do not include pistons. The engine includes top fixed plate 108 and bottom fixed plate 110. Positioned between top fixed plate 108 and bottom fixed plate 110 is combustion turbine 152. Combustion turbine 152 includes blades 180 positioned within a shroud 153. The blades 180 (turbine blades) are movable relative to shroud 153. The spaces between the blades 180 define the combustion chambers 120 of combustion turbine 152, with the blades 180 extending between an intake side 150 of combustion chamber 152 and a bottom side 170 of combustion chamber 152. The intake end of the combustion turbine 152 includes the top fixed plate 108 and the intake side 150 of the rotating combustion turbine 152. Top fixed plate 108 may be a relatively thick, fixed, metal plate that is attached to the internal circumference of the walls of external cylinder 102.

Top fixed plate 108 includes openings or holes defined therethrough, here shown as inlets 136. In some embodiments, top fixed plate 108 has an even number of inlets 136. In some embodiments, inlets 136 are arranged and spaced apart in a symmetrical pattern on top fixed plate 108. Top fixed plate 108 may include any number of inlets 136, such as from 1 to 12, or from 2 to 10, or from 4 to 8, or from 5 to 7. In some embodiments, top fixed plate 108 has at least four inlets 136. The number of inlets 136 may match the number of combustion chambers within combustion turbine 152. In certain embodiments, inlets 136 may be positioned in the middle two-thirds of top fixed plate 108, between center point 140 and circumferential perimeter 138. Inlets 136 allow for the passage of compressed feed-air 118 from compression chamber 124 into combustion chamber 120. Between inlets 136, are wedges of the material of which top fixed plate 108 is at least partially composed, herein referred to as power wedges 146.

Figure 3:
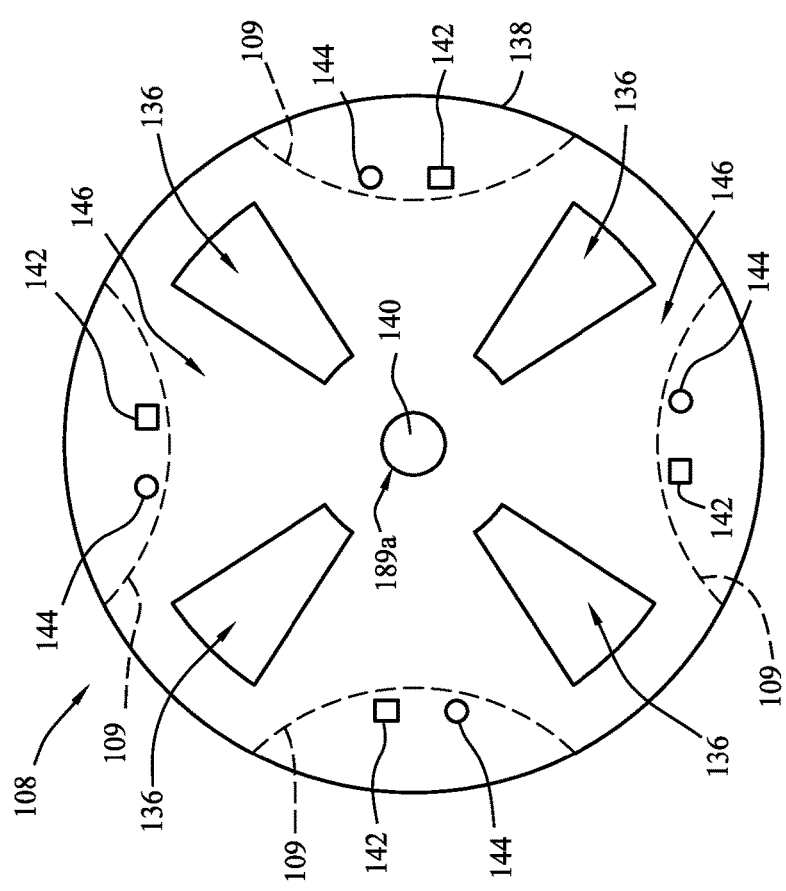
FIG. 3 depicts a top fixed plate of the engine with four intake inlets.

Engine 100 includes one or more ignition devices and one or more fuel injection devices. As shown in FIG. 3, in some embodiments, the ignition and fuel injection devices of engine 100 are coupled with top fixed plate 108, which, in some embodiments, may be positioned on the outside of compression chamber 124. Top fixed plate 108 includes ignition apparatus 142 for use in ignition of a fuel and air mixture within combustion chambers 120. Each ignition apparatus 142 may be positioned in or on top fixed plate 108 at locations between inlets 136. Top fixed plate 108 may include any number of ignition apparatus 142, such as from 1 to 12, or from 2 to 11, or from 3 to 10, or from 4 to 8, or from 5 to 7. In some embodiments, top fixed plate 108 has at least four ignition apparatus. The number of ignition apparatus may match the number of combustion chambers. In certain embodiments, the ignition apparatus is or includes spark plugs.

In some embodiments, each fuel injection port 144 may be coupled with and/or in communication with a Full Authority Digital Engine Controller (FADEC), which may be positioned outside of the engine cylinder, and may control the operation of engine 100, or components thereof. For example, the FADEC may control when and how much fuel is injected into combustion chamber, and when ignition apparatus is actuated (e.g., when a spark is generated by a spark plug). A FADEC is a system that includes a digital computer, also referred to as an electronic engine controller (EEC) or an engine control unit (ECU), as well as related accessories that control some or all aspects of engine performance.

As shown in FIG. 3, in some embodiments, the fuel injection devises of engine 100 are fuel injection ports in top fixed plate 108. Top fixed plate 108 includes fuel injection ports 144 for use in the injection of fuel into combustion chambers 120. Some exemplary fuels that may be injected include gasoline and diesel fuel. Each fuel injection port 144 may be positioned in or on top fixed plate 108 at locations between inlets 136. Top fixed plate 108 may include any number of fuel injection ports 144, such as from 1 to 12, or from 2 to 11, or from 3 to 10, or from 4 to 8, or from 5 to 7. In some embodiments, top fixed plate 108 has at least four fuel injection ports. The number of fuel injection ports may match the number of combustion chambers.

In some embodiments, the ignition and fuel injection components (e.g., ignition apparatus 142 and fuel injection ports 144) are positioned outside of external cylinder 102. For example, the broken lines 109 in FIG. 3 represent an alternative perimeter of top fixed plate 108, such that ignition apparatus 142 and fuel injection ports 144 are positioned outside of top fixed plate 108 and outside of external cylinder 102.

Figure 4:
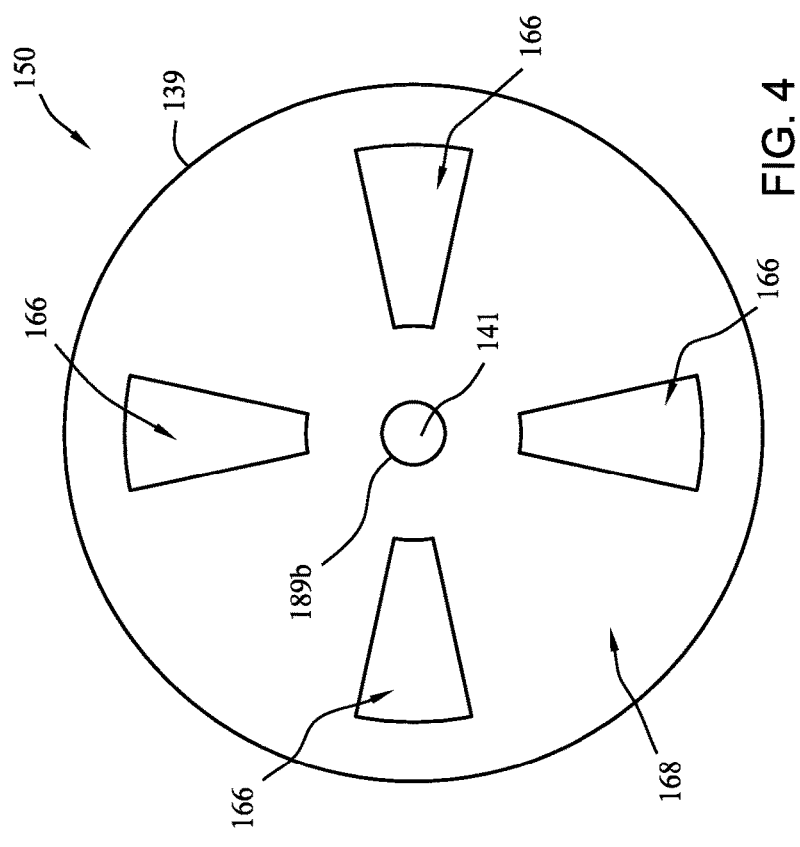
FIG. 4 depicts an intake end of a combustion turbine with four intake inlets.

FIG. 4 depicts an exemplary view of the combustion turbine 152 at the intake side 150. The combustion turbine 152 may be similar to the top fixed plate 108, with the exception that top combustion turbine 152 is not coupled with external cylinder 102 and can, thus, move relative to external cylinder 102, and combustion turbine 152 does not include fuel injection ports or ignition apparatus. Combustion turbine 152 may be a relatively thick, metal plate that is coupled to drive shaft 104. Combustion turbine 152 includes openings or holes defined through the intake side 150, here shown as inlets 166 into combustion chambers 120. In some embodiments, combustion turbine 152 has an even number of inlets 166. In some embodiments, inlets 166 are arranged and spaced apart in a symmetrical pattern on combustion turbine 152. Combustion turbine 152 may include any number of inlets 166, such as from 1 to 12, or from 2 to 10, or from 4 to 8, or from 5 to 7. In some embodiments, top rotating plate 150 has at least four inlets 166. In certain embodiments, inlets 166 may be positioned in the middle two-thirds of combustion turbine 152 at the intake side 150, between center point 141 and circumferential perimeter 139. When inlets 136 and inlets 166 are aligned, inlets 166 allow for the passage of compressed feed-air 118 from inlets 136 into combustion chambers 120. Between inlets 166, are wedges 168 of the material of which blades 180 are at least partially composed. The wedges 168 are also referred to as power wedges.

Thus, from second air compressor 130, air 118 passes through inlets 136 that are formed in top fixed plate 108 and through inlets 166 that are formed in the intake side 150 of combustion turbine 152, and enters combustion chambers 120. With air 118 inside of combustion chambers 120, the combustion turbine 152 rotates until inlets 136 and inlets 166 are no longer aligned and wedges 146 are aligned with inlets 166.

Figure 5:
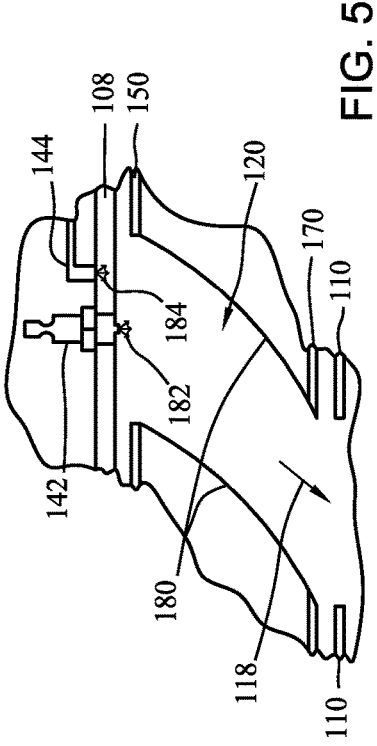
FIG. 5 depicts a combustion chamber of a combustion turbine.

As shown in FIG. 5, when wedges 146 are aligned with inlets 166, fuel 184 is injected into combustion chamber 120 via fuel injector 144 and ignition apparatus 142 provides spark 182 or other igniting medium within combustion chamber 120, resulting in ignition of fuel 184 in the presence of air 118 within combustion chamber 120. The ignition of the mixture of air 118 and fuel 184 results in the formation of combustion gases within combustion chamber 120. The combustion gases flow through combustion chamber 120, toward the exhaust end 170 of the combustion turbine 152, imparting a thrust force with a magnitude as large as the exhaust force upon the combustion chamber walls 180 (also referred to as combustion blades) that define combustion chamber 120. Because the exhaust outlets 176 of the exhaust end 170 are askew from the intake inlets 166, the combustion chamber walls 180 are curved as the combustion chamber extends from the inlets 166 to the outlets 176. This results in the expanding combustion gases exerting thrust force upon the combustion chamber walls 180 at angles oblique or perpendicular to the surfaces of the combustion chamber walls 180. The thrust force imparted on combustion chamber walls 180 drives the rotation of combustion turbine 152 which, in turn, drives the rotation of drive shaft 104, which may, in turn, drive the rotation of another component, such as the wheels of a vehicle.

Drive shaft 104 is positioned and extends along axis 106. Axis 106 may be coincident with or parallel with a longitudinal centerline of engine 100. In some embodiments, all or most of the internal components of engine 100 are attached to or otherwise coupled with drive shaft 104. In some such embodiments, exterior cylinder 102 is not attached to or coupled with drive shaft 104. In some such embodiments, top fixed plate 108 and bottom fixed plate 110 of engine 100 are coupled to or integral with drive shaft 104 via bearings, such that drive shaft 104 is movable relative to top fixed plate 108 and bottom fixed plate 110.

In some embodiments, one or more air-cooling holes 154 are located on the outside of top fixed plate 108 and/or within the walls of the combustion turbine 152. Air-cooling holes 154 provide for a cooling flow of air resulting from the pressure drop into the lower pressure area surrounding combustion turbine 152 where the combustion occurs. In some embodiments, air-cooling holes may incorporate pressure controllers to regulate the air pressure in the high-pressure pulsation damper and retention chamber 131.

With combustion chambers 120 allowing combustion turbine 152 to function as a combustion chamber of engine 100 and combustion chamber walls 180 allowing combustion turbine 152 to function as a turbine of engine 100, combustion turbine 152 is capable of extracting power using both combustion action and turbine action. Fuel 184 and air 118 flow periodically and intermittently into combustion turbine 152, and combustion takes place within combustion chambers 120, periodically and intermittently, with combustion occurring within the turbine, rather than upstream of the turbine. Thus, in some embodiments, the present disclosure includes a turbine having a chamber therein within which combustion occurs.

Figure 6:
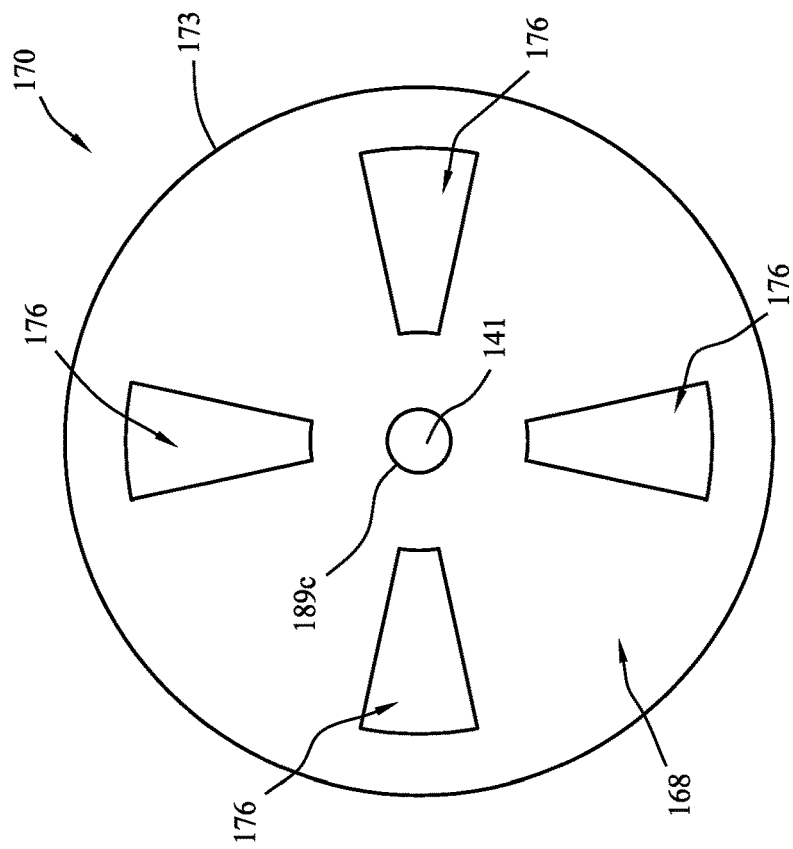
FIG. 6 depicts an exhaust end of a combustion turbine with four exhaust outlets.

The outlets 176 of exhaust end 170 of combustion turbine 152 and the outlets 101 of bottom fixed plate 110 define at least a portion of the exhaust end of engine 100. Exhaust end 170 has the same number of symmetrically positioned openings, outlets 176, as the intake end 150. FIG. 6 depicts an embodiment of exhaust end 170, including outlets 176 and wedges 168 (also referred to as exhaust wedges). In some embodiments, exhaust end 170 has an even number of outlets 176. In some embodiments, outlets 176 are arranged and spaced apart in a symmetrical pattern. Exhaust end may include any number of outlets 176, such as from 1 to 12, or from 2 to 10, or from 4 to 8, or from 5 to 7. In some embodiments, exhaust end 170 has at least four outlets 176. In certain embodiments, outlets 176 may be positioned in the middle two-thirds of exhaust end 170, between center point 141 and circumferential perimeter 173.

Figure 7:
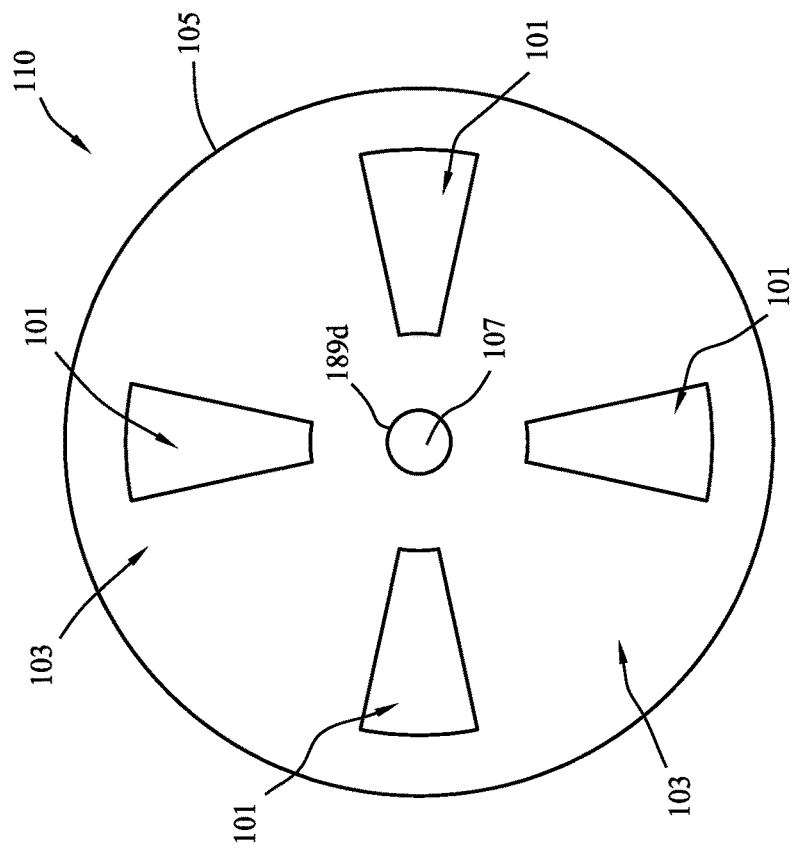
FIG. 7 depicts a bottom fixed plate of the engine with four exhaust outlets.

Bottom fixed plate 110 may have the same number of symmetrically positioned openings as top fixed plate 108. FIG. 7 depicts an embodiment of bottom fixed plate 110, including outlets 101 and exhaust wedges 103. In some embodiments, bottom fixed plate 110 has an even number of outlets 101. In some embodiments, outlets 101 are arranged and spaced apart in a symmetrical pattern on bottom fixed plate 110. Bottom fixed plate 110 may include any number of outlets 101, such as from 1 to 12, or from 2 to 10, or from 4 to 8, or from 5 to 7. In some embodiments, bottom fixed plate 110 has at least four outlets 101. In certain embodiments, outlets 101 may be positioned in the middle two-thirds of bottom fixed plate 110, between center point 107 and circumferential perimeter 105. Wedges 103 include the material of which bottom fixed plate 110 is at least partially composed, such as steel. Bottom fixed plate 110 may be a relatively thick, fixed, metal plate that is attached to or otherwise coupled with the circumference of the exterior cylinder 102 walls. Bottom fixed plate 110, similar to top fixed plate 108, may have an even number of symmetrically placed openings (e.g., four or more) positioned substantially in the middle two-thirds of bottom fixed plate 110. When outlets 176 and outlets 101 are aligned, outlets 101 and 176 allow for the passage of exhaust 186 out of combustion chambers 120.

Each of top fixed plate 108, combustion turbine 152, and bottom fixed plate 110 include a hole, holes 189*a*-189*d*. Holes 189*a*-189*d* are aligned such that drive shaft 104, extending along axis 106, passes through holes 189*a*-189*d*. Drive shaft 104 may be coupled with combustion turbine 152 at holes 189*b* and 189*c*, such that rotation of combustion turbine 152 rotates drive shaft 104. In some embodiments, drive shaft 104 is coupled with top and bottom fixed plates at holes 189*a* and 189*d*, such that drive shaft 104 can rotate relative to top and bottom fixed plates without causing top and bottom fixed plates to rotate.

Combustion turbine 152 includes a cylinder or shroud 153. Shroud 153 may be a relatively thick walled, hollow, metal (e.g., steel) cylinder. Shroud 153 may be coupled with the intake end 150 and exhaust end 170 of the combustion turbine 152. Shroud 153 may be smaller in diameter than top fixed plate 108. Combustion turbine 152 may be coupled with drive shaft 104. In some such embodiments, intake end 150 and exhaust end 170 of combustion turbine 152 are coupled with drive shaft 104 where drive shaft 104 passes through holes 189*b* and 189*c*. Rotation of combustion turbine 152 causes drive shaft 104 to rotate about axis 106. That is, rotation of combustion turbine 152 drives drive shaft 104 to correspondingly rotate.

Figure 8:
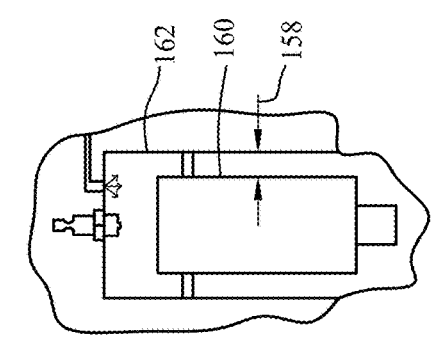
FIG. 8 depicts a portion of an internal combustion piston.

With reference to FIGS. 2 and 8, in some embodiments, tolerances 156 between top fixed plate 108 and the intake end 150 and between bottom fixed plate 110 and the exhaust end 170 are the same or substantially the same as the tolerance 158 between a piston 160 and sidewalls 162 thereof in an internal combustion piston engine.

Figure 9:
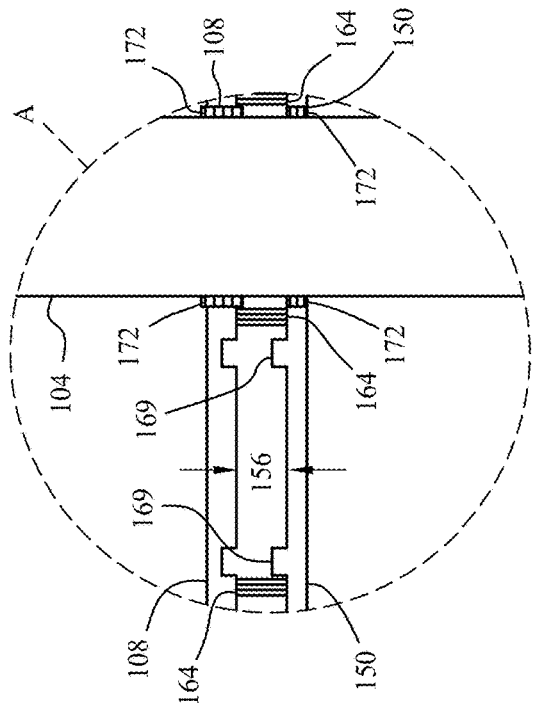
FIG. 9 depicts detail view A of FIG. 2.

With reference to both FIGS. 2 and 9, positioned between top fixed plate 108 and the intake end 150 are rings 164, which may be the same or substantially similar to rings that are used on a piston engine piston. Rings 164 are positioned on the outside and inside of inlets 166 and blast nibs 169 that are formed through top rotating plate 150. Bearings 172 are positioned between the engagement of top fixed plate 108 and drive shaft 104, such that the drive shaft 104 can rotate relative to the top fixed plate 108. Blast nibs 169 are built into or otherwise coupled with or incorporated into top rotating plate 150 and top fixed plate 108 to protect rings 164 and bearings 172, if needed. The bottom fixed plate 110 may be configured in the same manner as the top fixed plate 108 as described above with respect to FIGS. 2 and 9, with rings positioned between bottom fixed plate 110 and the exhaust end 170. Rings may be positioned on the outside and inside of outlets 176 and blast nibs that are formed through bottom rotating plate 170. Bearings may also be positioned between the engagement of bottom fixed plate 110 and drive shaft 104, such that the drive shaft 104 can rotate relative to the bottom fixed plate 110. Blast nibs may be built into or otherwise coupled with or incorporated into bottom rotating plate 170 and bottom fixed plate 110 to protect the rings and bearings, if needed.

Figure 10A:
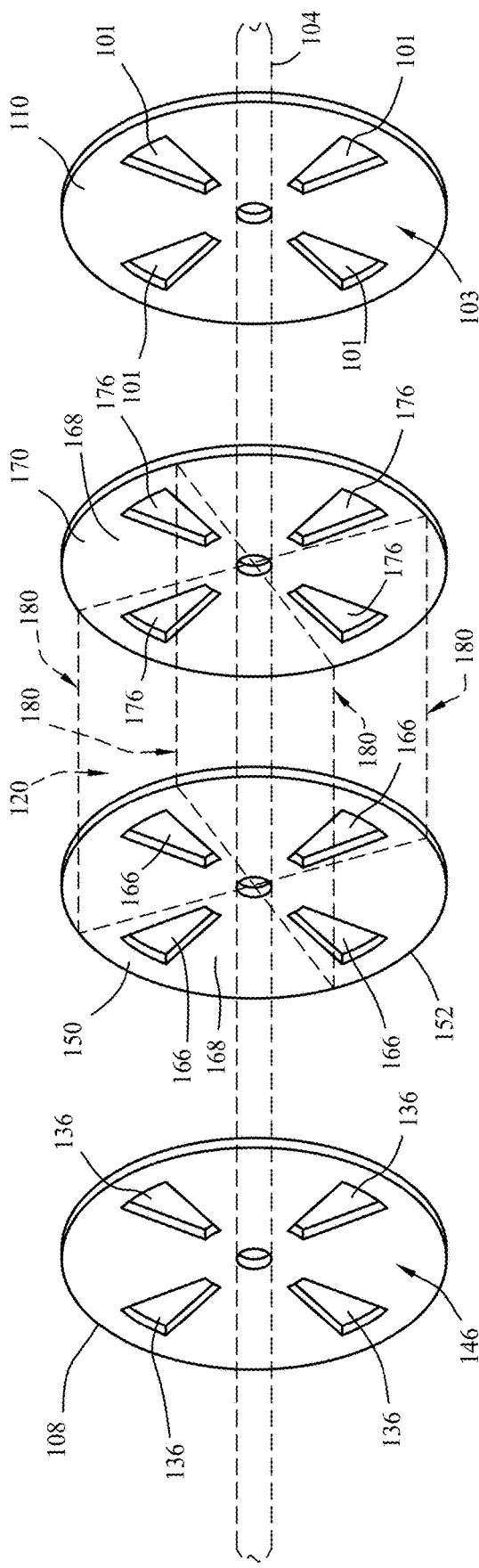
FIG. 10A depicts an exploded view of portions of a combustion turbine.
Figure 10C:
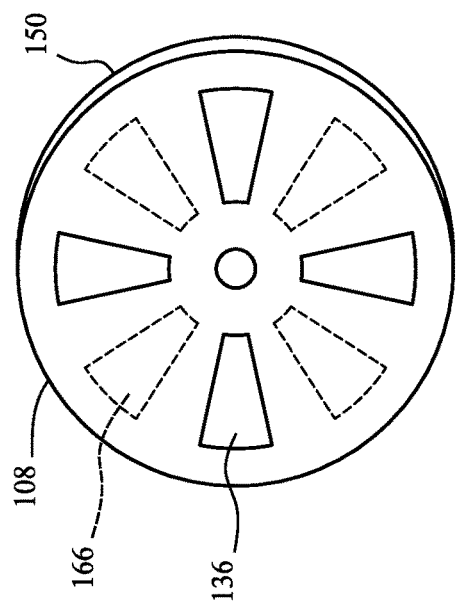
FIG. 10C depicts a combustion turbine with the inlets of the top fixed plate out of alignment with the inlets of the top rotating plate.
Figure 10E:
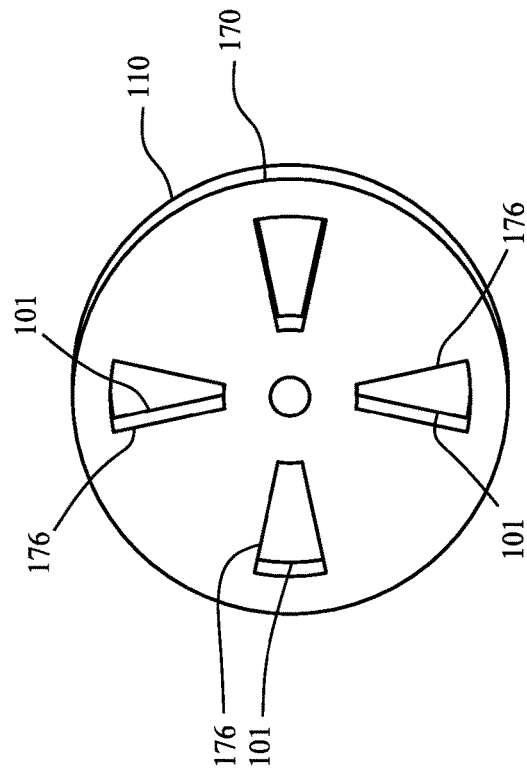
FIG. 10E depicts a combustion turbine with the inlets of the bottom fixed plate in alignment with the inlets of the bottom rotating plate.
Figure 10B:
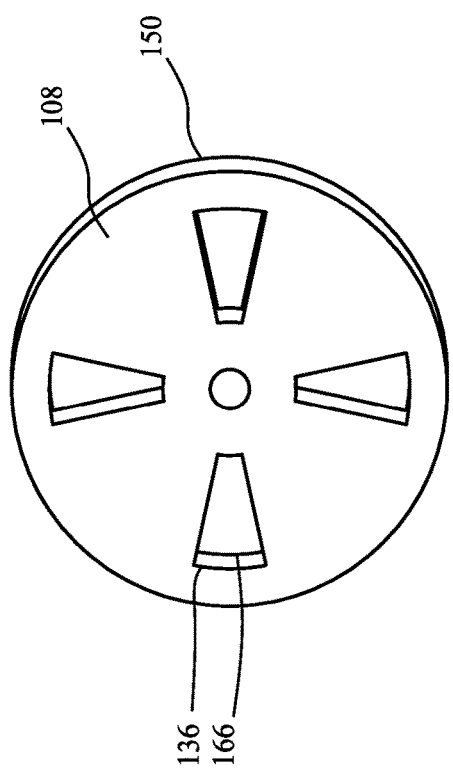
FIG. 10B depicts a combustion turbine with the inlets of the top fixed plate in alignment with the inlets of the top rotating plate.
Figure 10D:
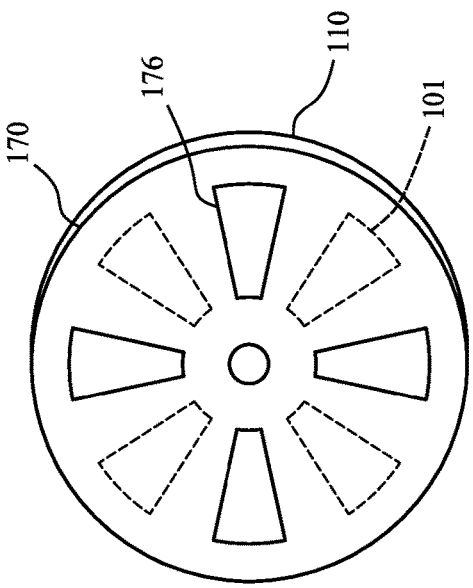
FIG. 10D depicts a combustion turbine with the inlets of the bottom fixed plate out of alignment with the inlets of the bottom rotating plate.

FIG. 10A depicts an exploded view of portions of the engine disclosed herein. Drive shaft 104 passes through and is coupled with top fixed plate 108, combustion turbine 152 (including top rotating plate 150 and bottom rotating plate 170, and bottom fixed plate 110. When inlets 136 are aligned with inlets 166 (FIG. 10B) and outlets 101 are aligned with outlets 176 (FIG. 10E), then air can enter and exit combustion chambers 120. When inlets 136 are not aligned with inlets 166 (FIG. 10C) and outlets 101 are not aligned with outlets 176 (FIG. 10D), then air cannot enter or exit combustion chambers 120. When inlets 136 are aligned with inlets 166 (FIG. 10B) and outlets 101 are not aligned with outlets 176 (FIG. 10D), then air can enter but not exit combustion chambers 120. When inlets 136 are not aligned with inlets 166 (FIG. 10C) and outlets 101 are aligned with outlets 176 (FIG. 10E), then air can exit but not enter combustion chambers 120.

In operation, compressed feed-air 118 flows through inlets 136 and 166 to fill combustion chambers 120 within combustion turbine 152, when inlets 136 and 166 are aligned, and when inlets 136 and 166 and outlets 176 and 101 are not aligned, combustion chambers 120 are enclosed. When combustion chambers 120 enclosed, combustion occurs therein. After combustion, outlets 176 and 101 become aligned such that exhaust 186 is expelled from combustion chambers 120. In some embodiments, the geometries of the inlets 136 and 166 and the outlets 176 and 101 are designed optimally in the following sequence: (1) compressed air fills the combustion chambers with high-pressure air; (2) the combustion chambers become enclosed and/or sealed forming a constant volume combustion chamber, at which time the introduced fuel and air is ignited; (3) the outlets 176 rotate to align with the outlets 101, to allow the combustion gases to begin being expelled out of the combustion chambers; thereby, producing a thrust force that drives the rotation of the combustion blades 180 of combustion turbine; (4) the inlets 166 rotate to align with the inlets 136, such that the top inlets (136 and 166) and the bottom outlets (101 and 176) are simultaneously open for exhaust of the high-temperature, high-pressure combustion gases, and to begin filling the combustion chambers with fresh, compressed gas; and (5) the bottom outlets (101 and 176) close via rotation of the bottom rotating plate 170 prior to closing the inlets (136 and 166) to trap high-pressure air in the combustion chambers.

Figure 11A:
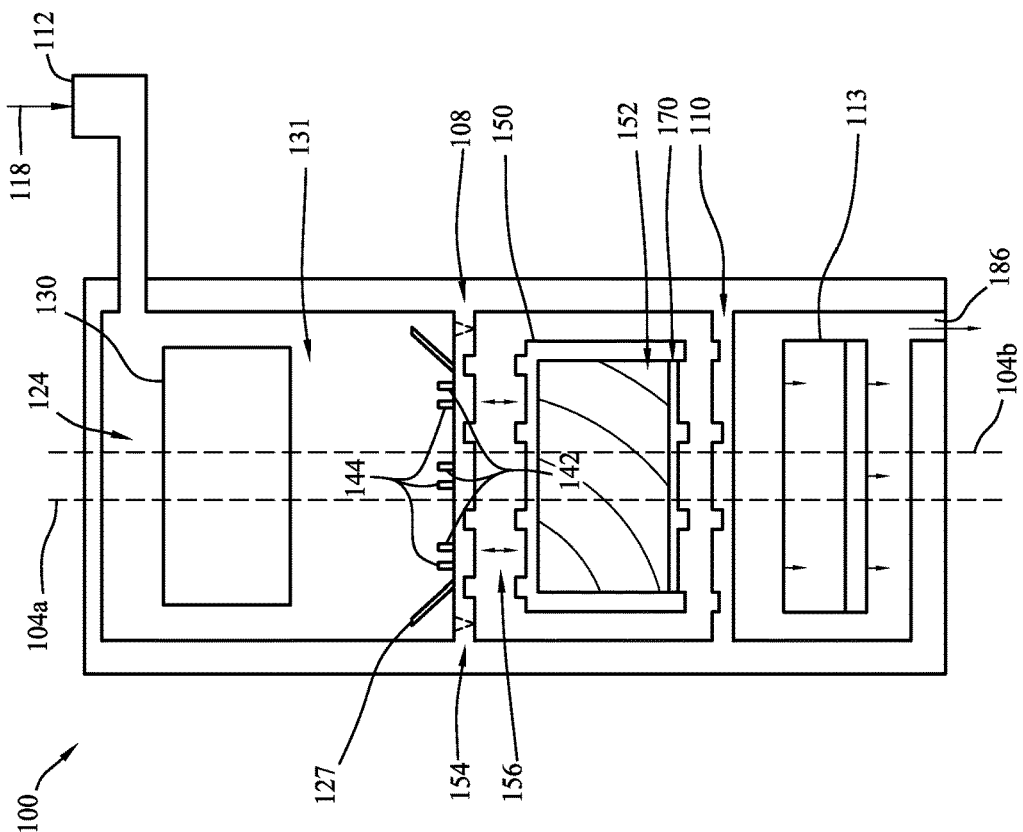
FIGS. 11A and 11B depict the combustion turbine engine.

FIG. 11A depicts another embodiment of engine 100. Engine 100 of FIG. 11A is substantially similar to engine 100 of FIG. 2, and like reference numerals indicate like elements. In FIG. 11A, air 118 first passes through a turbocharger, supercharger, or twincharger 116 prior to flowing into compression chamber 124. Instead of two compressors, as in FIG. 2, engine 100 in FIG. 11A has one high-pressure compressor 130. After compression, the compressed air 118 is stored in pulsation dampener and high-pressure retention chamber 131, wherein pulsation dampening of air 118 occurs. From chamber 131, air 118 is admitted through ports (inlets 136 and 166) into the high-pressure combustion turbine 152. Combustion takes place in the high-pressure combustion turbine 152 while both the intake ports (136 and 166) and exhaust ports (101 and 176) are closed, such that a constant volume combustion event occurs within combustion chambers 120. Thus, exhaust gas 186 leaves the high-pressure combustion turbine 152 through exhaust ports (101 and 176) and is then expanded before being discharged as exhaust. Exhaust 186 may flow through turbocharger 116, if used. Exhaust 186 (air and combustion gases) may then flow into an exhaust system downstream of engine 100 that is the same as or substantially similar to exhaust systems used in reciprocating engines. In the embodiment shown in FIG. 11A, drive shaft work is available at both ends of drive shaft 104*a* and 104*b*. As such, the drive shaft of engine 100 may be used to drive two different components. In some embodiments, combustion turbine 152 is at least partially composed of one or more materials of sufficient strength and weight such that combustion turbine 152 is capable of containing the combustion gases and, therefore, is capable of functioning as a flywheel.

Figure 11B:
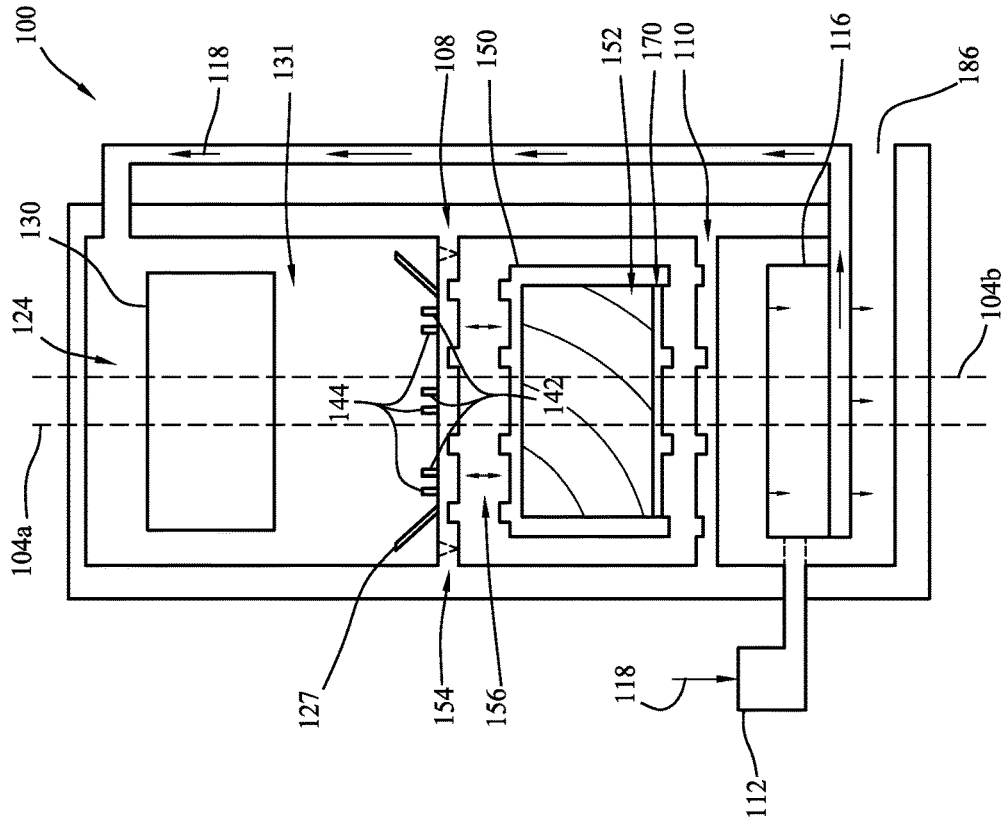

FIG. 11B depicts another embodiment of engine 100. Engine 100 of FIG. 11B is substantially similar to engine 100 of FIGS. 2 and 11A, and like reference numerals indicate like elements. In FIG. 11B, air intake 112 is positioned on the "cold" side of engine 100, rather than at the exhaust end. Air 118 enters engine 100 and is compressed by one or more compressors (e.g., including compressor 130) prior to entering combustion turbine 152. The exhaust 186 passes through an auxiliary turbine 113 after existing combustion turbine 152. The auxiliary turbine 113 may be coupled with drive shaft 104, such that auxiliary turbine 113 harvests energy from the exhaust 186, causing the auxiliary turbine 113 to rotate. Rotation of the auxiliary turbine 113 causes drive shaft 104 to rotate.

Engine Cycle

In certain embodiments, the engine disclosed herein is relatively efficient, and includes three distinct stages or "strokes". The three distinct stages or "strokes" of the engine include: (1) a compression and loading stage (i.e., compression of air and filling of the combustion chambers with compressed air and fuel); (2) a detonation stage (i.e., detonation of the fuel in the presence of air within the combustion chambers); and (3) an exhaust stage (i.e., exhaust of the combustion gas from the combustion chambers). The combustion turbine: (1) is rotatable relative to the top fixed plate to selectively allow passage of air flow into the combustion chambers from the inlets of the top fixed plate (i.e., loading of the combustion chambers); (2) is rotatable relative to the top fixed plate and bottom fixed plate, such that inlets and outlets in both top and bottom rotating plates are closed against (i.e., not aligned with) the inlets and outlets in the top and bottom fixed plates, providing for detonation of air and fuel in the combustion chambers (i.e., the detonation stage); and (3) is rotatable relative to the bottom fixed to selectively allow exhaust flow out of the outlets of the bottom fixed plate from the combustion chambers (i.e., exhaust of the combustion chambers). Thus, in some embodiments, the engine disclosed herein is a three stage or stroke engine, having fewer stages or strokes in comparison to a four stage or stroke piston engine, which includes the four distinct stages of: (1) detonation, (2) exhaust, (3) loading, and (4) compression. In some embodiments, the engine disclosed herein cycles through the three "stages" or "strokes" of the engine with less than one revolution of the drive shaft of the engine, whereas, a four stage or stroke piston engine stroke piston engine, cycling through detonation, exhaust, loading, and compression, requires a 720° of drive shaft rotation.

Figure 12:
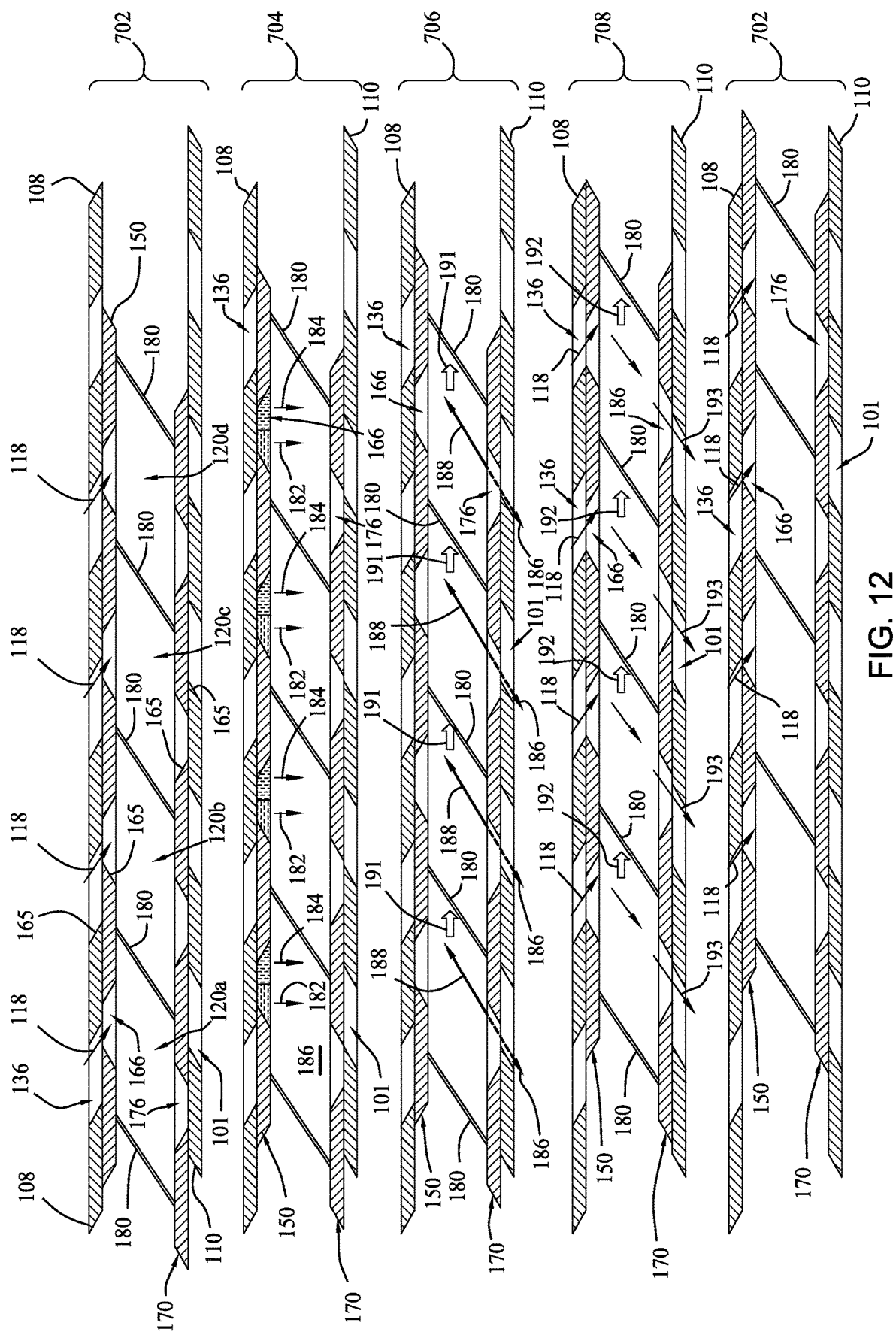
FIG. 12 is an illustration of a combustion sequence of the engine.

FIG. 12 illustrates the positions of the components of the rotating internal combustion engine disclosed herein during the various stages or strokes of the engine, including illustrating the positions of the combustion turbine relative to the top and bottom fixed plates, and illustrating the flow of air and combustion products through a single cycle of the engine. A Full Authority Digital Engine Controller controls all or at least some of the engine functions, including ignition and fuel injection. The engine represented in FIG. 12 includes four combustion chambers, 120a-120d.

In first position 702, as shown at the top of FIG. 12, the intake end, including top fixed plate 108 and top rotating plate 150, and exhaust end, including bottom fixed plate 110 and bottom rotating plate 170, are positioned such that the outlets 176 are not aligned with the outlets 101 in the bottom fixed plate 110, and the inlets 166 are only partially aligned with the inlets 136 such that feed air 118 flows into the combustion chambers 120a-120d, without flowing out of the combustion chambers 120a-120d. Thus, in the first position 702, the combustion chambers 120a-120d are pressurized by the incoming air 118. The first position 702 is also referred to herein as the "feed air position" and is the position of the top and bottom fixed and rotating plates during the compression and loading stage of the engine disclosed herein.

In second position, 704, the intake end is positioned such that inlets 166 are not aligned with inlets 136 in top fixed plate 108. Also, the exhaust end is positioned such that outlets 176 are not aligned with the outlets 101 on the bottom fixed plate 110. As such, air positioned above the top fixed plate 108 cannot flow into or out of the combustion chambers 120a-120d. That is, the combustion chambers 120a-120d are closed at the time of ignition. Also, the volume of the combustion chambers 120a-120d in the second position 704 is fixed, such that the combustion chambers 120a-120d are constant volume combustion chambers in the second position. In the second position 704, ignition 182 and fuel 184 are provided into combustion chambers 120a-120d. While second position 704 is shown as configured for ignition and detonation of a fuel and air mixture, in some circumstances, such as during idling conditions of the engine, the FADEC may not initiate fueling, ignition and detonation, such as if combustion is not needed at that time. The second position 704 is also referred to herein as the "combustion position" and is the position of the top and bottom fixed and rotating plates during the detonation and combustion stage of the engine disclosed herein. The ignition of fuel 184 produce combustion gases 186 within combustion chambers 120a-120d.

In third position 706, the intake end and exhaust end are rotated (e.g., rotated about drive shaft 104) such that the outlets 176 are partially aligned with the outlets 101 in the bottom fixed plate 110, such that combustion gas 186 may begin to flow from the combustion chambers 120a-120d as exhaust; thereby, imparting a thrust force 188 (aerodynamic thrust) directed into combustion chambers 120a-120d which is imparted upon the combustion chamber walls 180, transferring torque 191 thereto that drives the rotation of combustion turbine 152, which, in-turn, drives the rotation of drive shaft 104. The third position 706 is also referred to herein as the "exhaust position" and is the position of the top and bottom fixed and rotating plates during the exhaust stage of the engine.

In fourth position 708, the intake end and exhaust end are rotated to a point such that the outlets 176 are more fully aligned with outlets 101 in the bottom fixed plate 110, and the inlets 166 are more fully aligned with the inlets 136 in the top fixed plate 108, relative to the third position 706. As such feed air 118 again flows into and out of the combustion chambers 120a-120d; thereby, imparting torque 192 upon the combustion chamber walls 180 through aerodynamic lift in a manner the same as or similar to the action of a pinwheel, a wind turbine, or a turbocharger turbine. Thus, the incoming air 118 produces a "windmill effect", rotating the combustion turbine 152. The exhaust 193 from combustion chambers 120a-120d in the fourth position may be a scavenging or scavenger exhaust that may include a mixture of feed air 118 and any remaining combustion gases 186 within combustion chambers 120a-120d. Thus, the fourth position 706 is also referred to herein as the "scavenge position", "scavenger position" or "scavenging position," and is the position of the top and bottom fixed and rotating plates during the scavenging stage of the combustion gases.

After fourth position 708, the intake end and exhaust end rotate back into the first position 702, such that the engine cycle begins again. While the combustion blades 180 are shown as straight, angled blades in FIG. 12, the combustion blades are not limited to this shape and configuration, and may be curved, such as for aerodynamic efficiency. As shown in FIG. 12, the inlets and outlets (101, 136, 166, and 176) can have beveled and/or angled surfaces that direct the flow of gas therein, which is explained in more detail below with reference to FIG. 20.

Idealized Engine Cycle

Figure 13:
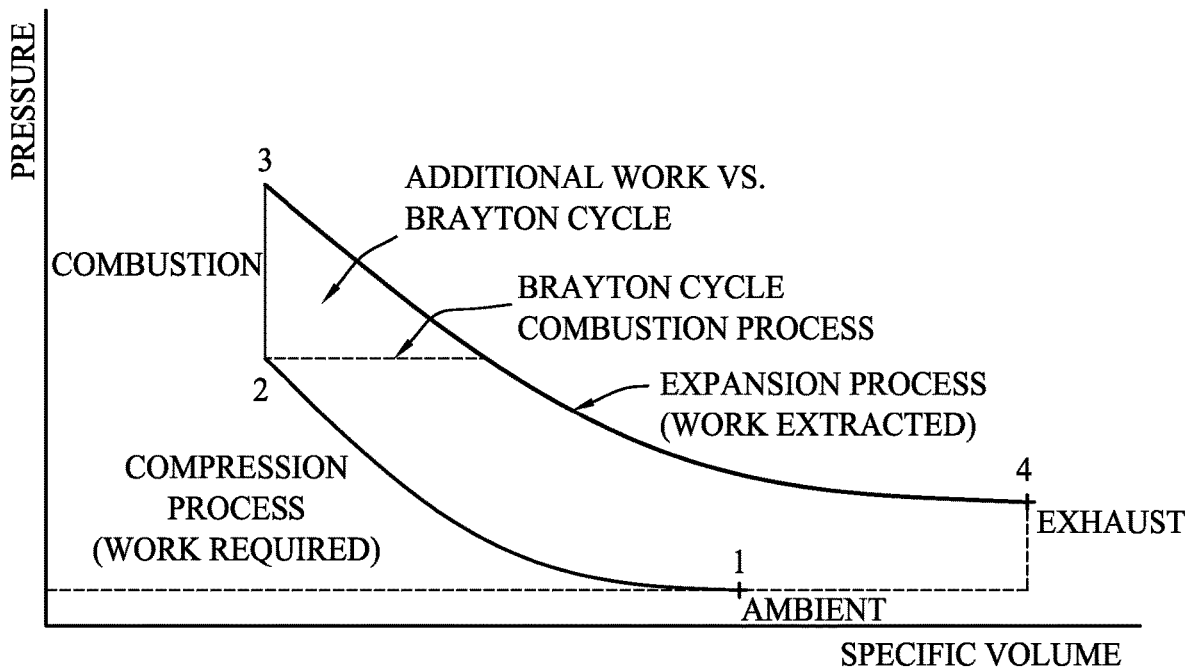
FIG. 13 is a graph of pressure vs. specific volume for an idealize process.
Figure 14:
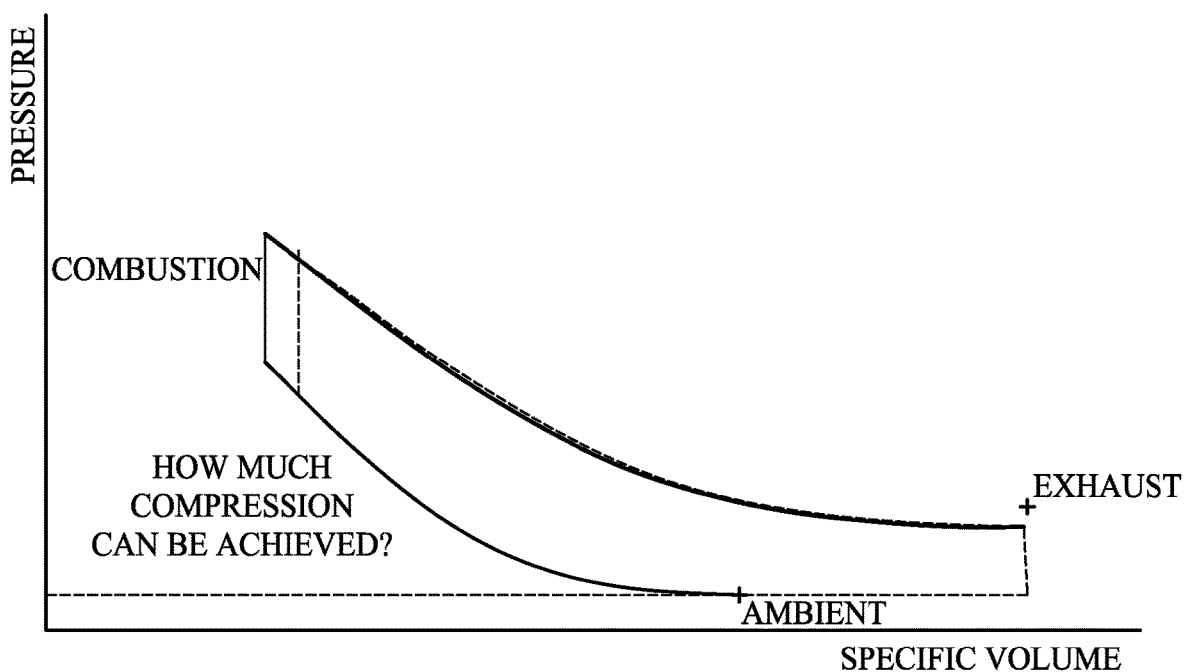
FIG. 14 is a graph of pressure vs. specific volume showing the increase in work output resulting from increased compression ratio.

In some embodiments, the performance of the combustion turbine engine disclosed herein may be evaluated by plotting the coordinates of pressure versus volume. In one particular evaluation, the combustion turbine engine disclosed herein is compared with an idealized Brayton Cycle (gas turbine). The pressure (P) versus volume (V) coordinates provide a direct indication of work transfer during each engine process. Work is equal to pressure multiplied by the change in volume or, in other words, work is the area inside of a P-V diagram. FIGS. 13 and 14 are graphs of pressure versus volume, with the volume on the x-axis of the graph being "specific volume". "Specific volume" is the ratio of the volume of a gas to the mass of the gas. In other words, specific volume is the inverse of density. That is, specific volume is volume per unit mass, rather than mass per unit volume. In some embodiments, such as in the case of a closed combustion chamber, specific volume and actual physical volume are equivalent. During combustion in a closed combustion chamber, pressure and temperature of the gas increases; however, the density and specific volume remain constant.

The idealized processes of the combustion turbine engine disclosed herein are depicted in FIG. 13. In the data of FIG. 13, it is assumed that a compressor section similar to that of a gas turbine engine is positioned upstream of the combustion chamber of the combustion turbine engine. In the data of FIG. 13, it is also assumed that an expansion (auxiliary turbine) stage is positioned downstream of the combustion turbine engine to recover energy from the exhaust gas of the combustion turbine engine. With reference to FIG. 13, air at ambient conditions enters the engine at State 1. Initial compression occurs in the compressor blading from State 1 to State 2 of the engine process. In the graph of FIG. 13, movement from right to left on the plot indicates work that must be done on the gas, with the amount of work given by the area under the process curve. Thus, the compression stage, moving from State 1 to State 2, requires work input from the engine. After completion of compression, State 2, the air and fuel are then transferred into the combustion chambers of the engine. Within the combustion chambers of the engine, combustion occurs at a constant volume; thereby, increasing the pressure and temperature within the combustion chamber to State 3. As movement along the process line, from State 2 to State 3, is vertical (i.e., there is no specific volume change), no work is done during this stage of the idealized engine process. The exhaust gas then exits the combustion chamber and passes through an expansion process, moving from State 3 to State 4. Movement from left to right on the plot indicates work that is extracted, with the amount of work extracted given by the area under the process curve. Thus, work extraction occurs from State 3 to State 4. The design of the combustion chamber passages at least partially defines the amount of work that may be extracted at this stage of the engine process.

For comparison purposes, the constant pressure combustion process of a typical idealized Brayton Cycle gas turbine engine is depicted in FIG. 13 as well. As shown, from State 2, the typical idealized Brayton Cycle gas turbine engine process line (dashed line) moves from left to right, not vertically. This results in additional work being extracted from using the rotating combustion turbine engine disclosed herein in comparison to the typical idealized Brayton Cycle gas turbine engine. The triangular section indicated above the Brayton Cycle combustion process line (dashed line) represents the additional work output that is harvested by the idealized rotating combustion turbine engine disclosed herein. Without being bound by theory, it is believed that the combination of a constant volume combustion process within a rotating combustion turbine engine disclosed herein provides for the extraction of more work from combustion in comparison to a typical gas turbine (Brayton Cycle gas turbine).

Deviations from the Idealized Engine Cycle

FIG. 13 illustrates an idealized rotating combustion turbine engine cycle. However, all engines deviate from idealized cycles. Minimizing deviations from the ideal engine cycle provides for increases in work extraction and efficiency of engines.

One parameter in the engine cycle that may deviate from idealized conditions is the amount of compression of the air intake prior to combustion. Without being bound by theory, it is believed that engine cycle efficiency increases as the engine cycle processes are conducted at higher pressures. While increasing the compression pressure prior to combustion increases compression work, it also increases the amount of work extracted during the subsequent expansion of the gases in the turbine section of the engine. One embodiment of net increase in work extraction by compression is shown in FIG. 14. In FIG. 14, the dashed lines show an initial engine work cycle, and the solid lines show a potential engine work cycle with increased net output of work based on a higher compression ratio of the intake air. In some embodiments, the use of a turbocharger, a supercharger, a nozzle, one or more compressors, or combinations thereof, positioned upstream of the combustion chamber provides for the compression of the air intake into the combustion turbine engine disclosed herein; thereby, increasing the engine cycle efficiency thereof. Without being bound by theory, it is believed that the efficiency of the compression process impacts the shape of the compression process curve in FIG. 14, that is the shape of the line from State 1 to State 2. Thus, the efficiency of the compression process impacts the amount of work (i.e., the area under the curve) required for compression of the air intake.

Figure 15:
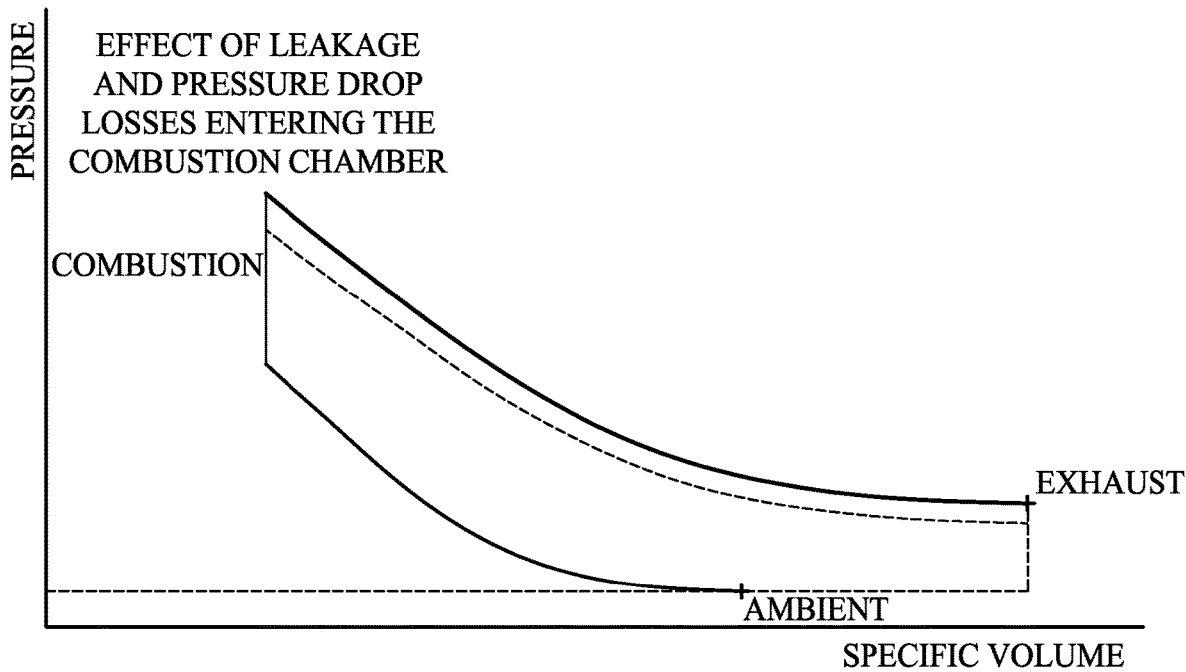
FIG. 15 is a graph of pressure vs. specific volume showing the effect of leakage and pressure drop losses entering the combustion chamber.

Another parameter in the engine cycle that may deviate from idealized conditions is in gas transfer losses entering the combustion chambers. A pressure drop is encountered in transferring the air intake charge into the combustion chambers, which drives the gas flow from the high-pressure retention chamber through the inlet ports and into the combustion chambers. The impact of gas transfer losses and pressure drop is shown in the idealized process diagram of FIG. 15. In FIG. 15, the original process is shown in solid lines, and the process accounting for pressure loss into the combustion chamber is shown in dashed lines. The compression work that is required in FIG. 15 is unchanged from that of FIGS. 13 and 14. However, the expansion work that is extracted in FIG. 15 is reduced in comparison to that of FIGS. 13 and 14 due to gas flow losses and pressure drop through the inlet ports and into the combustion chambers. In some embodiments, sealing and tight tolerances are used to reduce transfer loss.

Another parameter in the engine cycle that may deviate from idealized conditions is timing of the combustion process and leakage from the combustion chambers. Preferably, combustion timing is configured to ensure a sufficient amount of time for completion of combustion while the combustion chamber is closed. That is, the timing of when the intake inlets of the combustion turbine and the inlets of the top fixed plate are in the open or closed configuration, and the timing of when the exhaust outlets of the combustion turbine and the outlets of the bottom fixed plate are in the open or closed configuration, are preferably configured such that the intake inlets (136 and 166) are closed while the exhaust outlets (176 and 101) are also closed for a time that is sufficient for completion of combustion to occur.

Figure 16:
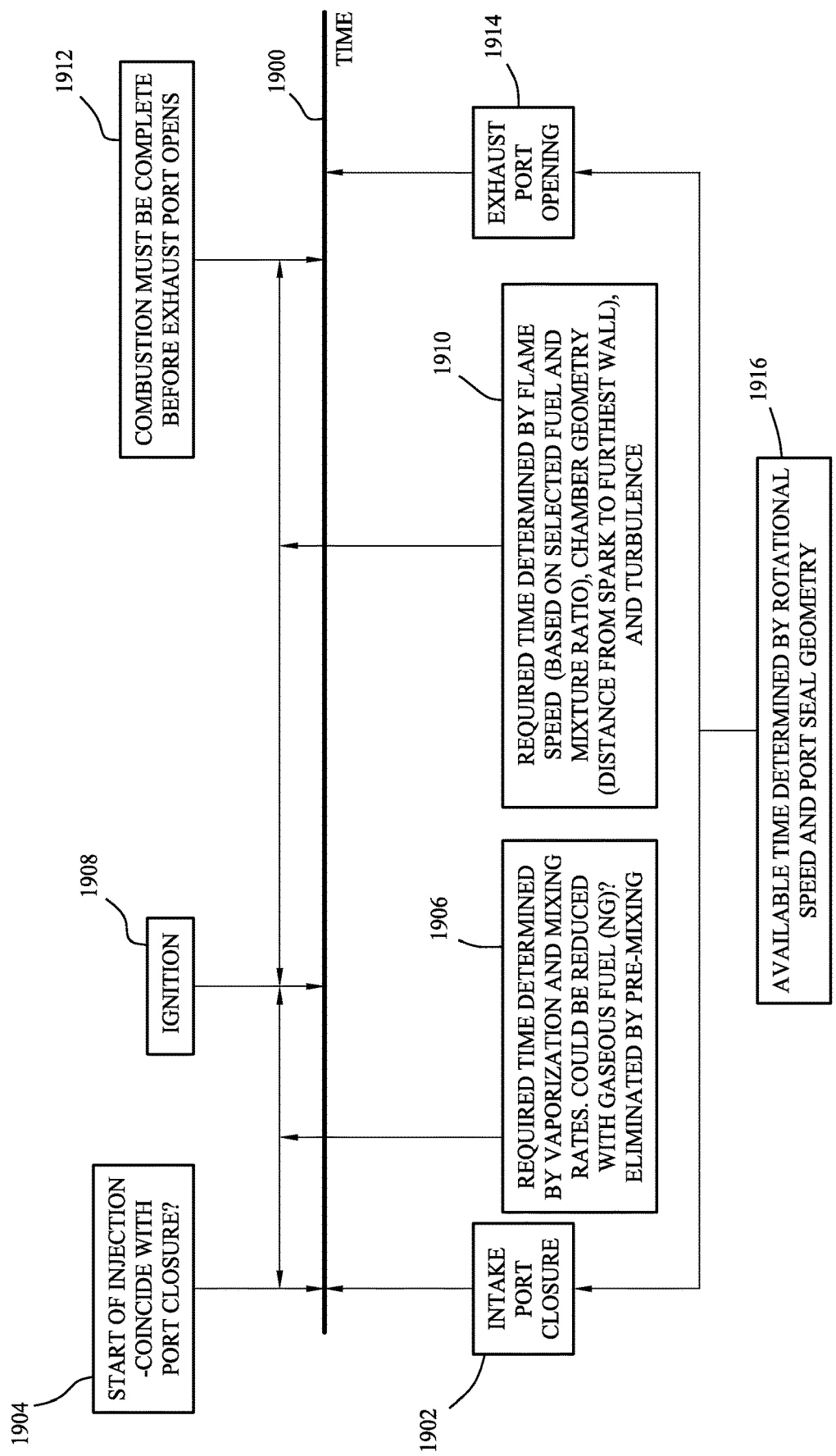
FIG. 16 is a timeline of an engine sequence.

FIG. 16 depicts one exemplary sequence of events that occur between intake port closure (i.e., when the inlets 136 and 166 are in the closed configuration) and exhaust port opening (i.e., when the outlets 176 and 101 are in the closed configuration). In some embodiments, the fuel and air are mixed prior to admission of the fuel and air into the combustion chambers, allowing ignition to occur immediately after intake port closure. With reference to FIG. 16, engine cycle events are shown occurring over timeline 1900. At time 1902, intake port closure occurs, optionally with fuel injection, time 1904, occurring simultaneously. At time 1906, the fuel and air are mixed. The time period from time 1904 to time 1906 is determined by vaporization of the fuel and mixing rates of the fuel and air, and could be reduced by using a gaseous fuel and/or by pre-mixing the fuel and air. At time 1908 ignition of the fuel/air mixture occurs. Time 1910 indicates the remaining time available, from the occurrence of ignition to completion of combustion. This time frame is determined by the flame speed, which is based on the selected fuel and the mixture ration of the air and fuel, by the combustion chamber geometry (e.g., the distance between the spark of the ignitor and the furthest wall of the combustion chamber), and by the degree of turbulence within the combustion chamber. At time 1912, combustion is completed, preferably before the exhaust ports open at time 1914. At time 1916, the time between the intake port closure, time 1902, and the exhaust port opening, time 1914, is indicated as being determined by the rotation speed of the combustion turbine and the seal geometry of the inlet and outlet ports thereof.

Before discussion of the combustion duration of the combustion turbine engine disclosed herein, the combustion during a typical spark ignited piston engine will be described for context. The combustion during a typical spark ignited piston engine is approximately 15 to 20 crank degrees for an engine running at 2500 RPM. This is assuming a 10%-90% burn duration time, which is the time from the point where 10% of the fuel has burned to the time where 90% of the fuel has burned. There is a delay from the initial ignition spark event and the achievement of the point where 10% of the fuel has burned, which can be in the range of 5 to 15 degrees, depending on the available ignition energy. These two delays are cumulative. The ignition delay and the 10-90% burn duration are dependent on the charge air motion, where a greater amount of charge air motion is better up to a limit where the charge air motion extinguishes the spark of the ignitor out. In a spark ignited engine, tumble (a tumble flap) is typically used to provide higher charge motion.

In the four combustion chamber engine cycle represented in FIG. 12, there is one firing event (combustion event) for every 90 degrees of crankshaft rotation (drive shaft rotation). Thus, in the engine cycle of FIG. 12, all stages or strokes of the engine cycle occur within a 90-degree rotation of the shaft. For comparison, a typical 4-stroke piston engine requires 720 degrees (i.e., 180 degrees per stroke) of crankshaft rotation for all stages or strokes of the engine cycle to occur, including charging the combustion chamber with fresh air and fuel, compression, combustion, and expansion.

In some embodiments, the timing of the opening and closing of the inlet and outlet ports is optimized based upon thermodynamic considerations. For example, a thermodynamic simulation of the combustion turbine engine may be performed to optimize the timing of the opening and closing of the inlet and outlet ports. In some such embodiments, the combustion duration of the combustion turbine engine can be determined based on detailed computational analysis of flame speed, combustion chamber geometry, and turbulent motion generated in the combustion chambers. In some such embodiments, the combustion turbine engine is designed to achieve relatively high turbulence. Without being bound by theory, it is believed that high turbulence provides for short combustion durations.

In some embodiments, the occurrence of gas leakage out of the combustion chambers, both towards the compression chamber and towards the exhaust (e.g., towards the auxiliary turbine) is reduced or eliminated. In the combustion turbine engine, there is at least some clearance between the fixed plates and the rotating combustion turbine. This clearance allows at least some gas to leak across the two plates when there is a pressure difference, such as a pressure difference between the compressor outlet or the auxiliary turbine inlet and the combustion chambers. This gas leakage can be minimized by careful sealing between the fixed and rotating plates, such as by providing rings 164. Gas leakage during combustion events are a direct availability loss, because high-pressure gas is throttled to a lower pressure region without any work being extracted. As used herein, an "availability loss" is energy that is no longer available to do work in the remainder of the engine cycle.

Figure 17:
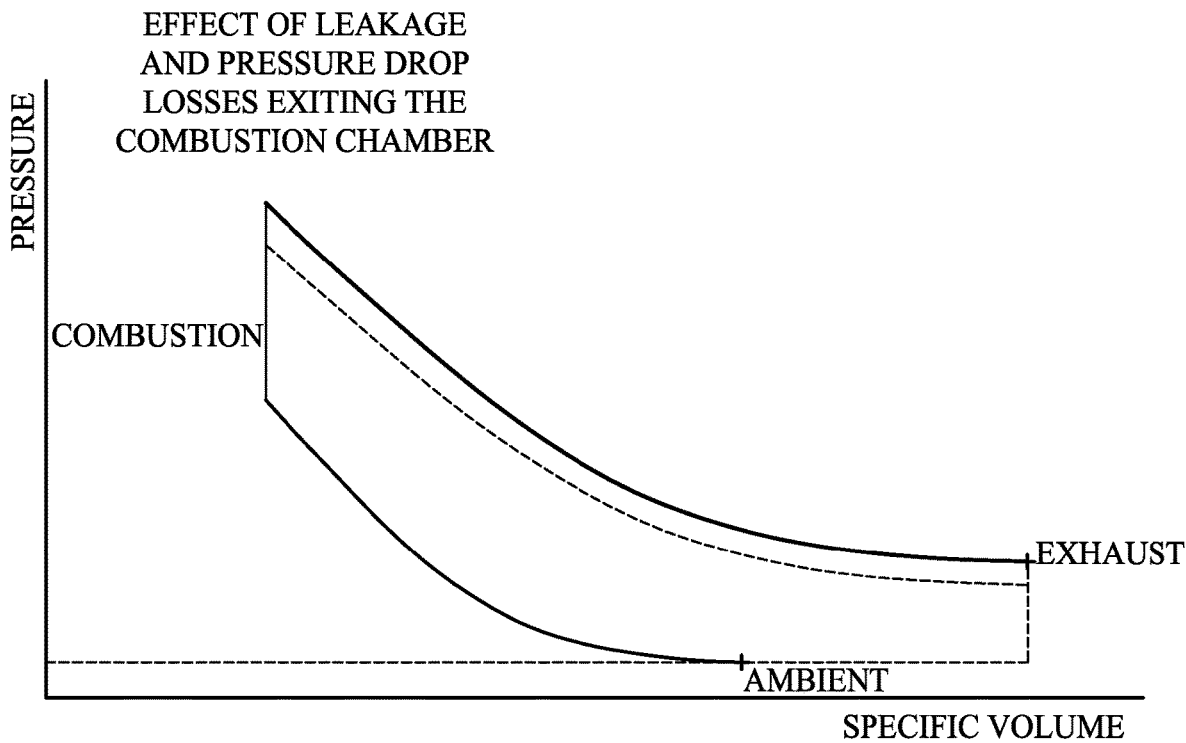
FIG. 17 is a graph of pressure vs. specific volume showing the effect of leakage and pressure drop losses exiting the combustion chamber.

Similar to the throttling losses during the transfer of gas from the high-pressure retention chamber into the combustion chambers, pressure drop losses may occur through the exhaust ports as gas exits the combustion chamber. As with the gas leakage from the combustion chamber, these pressure drops (also called "throttling losses") are a direct availability loss that reduces the amount of work that can be extracted. The higher temperature and pressure of the exhaust gas can exacerbate the reliability, durability, and the magnitude of any pressure drop losses. The effect of such losses on work output is shown in FIG. 17. The solid upper line in the graph shows the ideal process, while the dashed line accounts for the effects of pressure drop across the exhaust ports, as well as gas leakage from the combustion chambers.

Another parameter in the engine cycle that may deviate from idealized conditions is in the expansion process efficiency. In some embodiments, the combustion turbine engine provides for a high-efficiency work extraction coincident with the combustion chambers to produce work. In some embodiments, the combustion turbine engine is provided with a high-efficiency work extraction process or apparatus (e.g., expansion auxiliary turbine) positioned downstream of the combustion chambers to produce additional work and to drive the compression process and to generate work (e.g., the area between the two curves in FIGS. 13-15 and 17. Isentropic efficiency and the length of the process line (how low the exhaust pressure and temperature can be taken during work extraction) can be optimized to increase the efficiency of the work extraction of the combustion turbine engine.

Compression and Expansion Efficiency

In a traditional gas turbine operating on a cycle that is related to a Brayton air-standard cycle, air is compressed from ambient conditions to elevated temperature and pressure using steady-flow, rotational compressor blading, typically in multiple stages. After compression, the compressed gas enters a non-moving combustion section where fuel is mixed and burned at a constant pressure, but with a large increase in temperature and specific volume. The combustion gases then enter the turbine stage where expansion is accomplished across a, typically, multiple stage rotating turbine section. The combustion turbine engine disclosed herein replaces the constant flow and constant pressure combustion chamber with a constant volume, non-steady flow rotating combustion chamber. The combustion turbine engine disclosed herein extracts work from the rotating combustion chamber, using vanes, blades or other shapes internal to the combustion chamber walls, such that departing combustion gases produce work that is transferred to the drive shaft.

Figure 18:
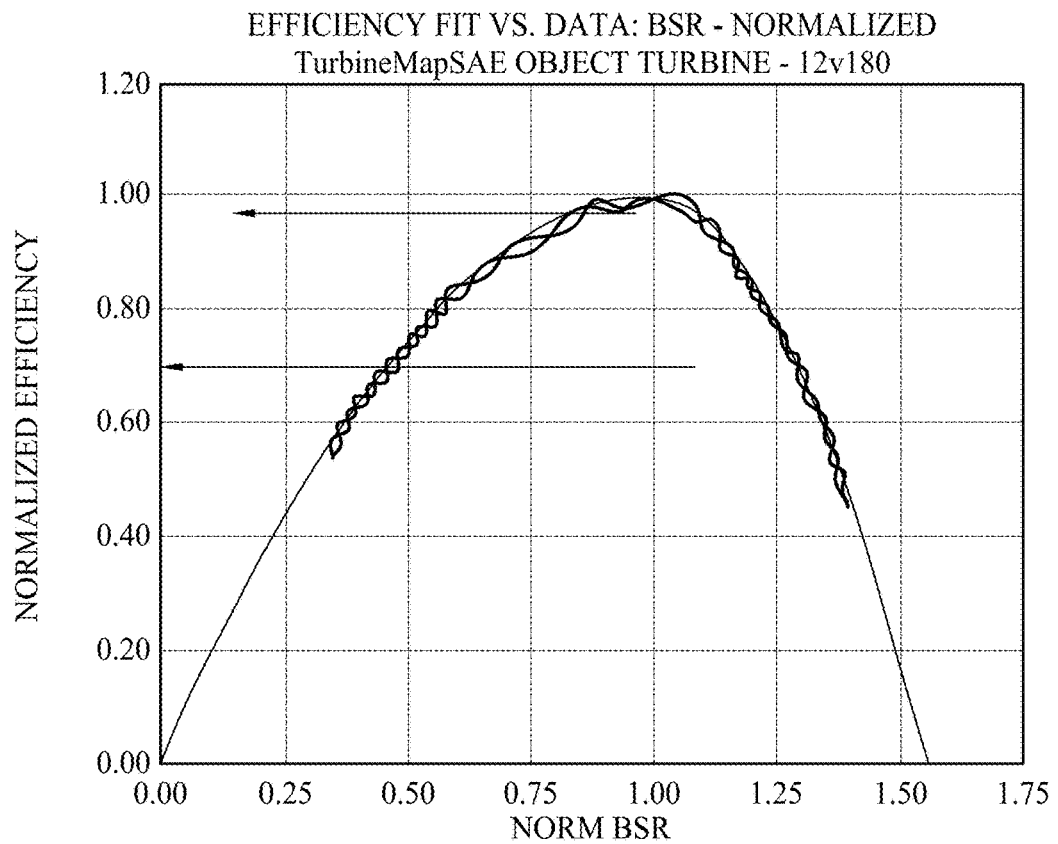
FIG. 18 is a graph of normalized turbine efficiency as a function of blade speed ratio.

Without being bound by theory, it is believed that there are two methods to directly extract energy from a hot, pressurized gas. One method is to provide a closed chamber moving boundary expansion, such as is done in a piston engine, with the gas expanding against the piston and creating expansion or Pressure-Volume (P-V) work. The other method is expansion in continuous flow across rotating turbine blades, where momentum energy is imparted to the blades by the gas, which has typically been accelerated through a nozzle. Turbine characteristics include a "blade speed ratio" effect on efficiency. Blade speed ratio (BSR) is defined as the blade velocity divided by the isentropic gas velocity, which is the velocity that the gas could achieve if expanded isentropically across the available pressure ratio. It is helpful to think of BSR (at a relatively fixed blade speed) as being proportional to the inverse of gas velocity; that is, at high gas velocities the BSR is low and vice-versa. Thus, in a steady flow environment there is minimal BSR variation, while in a highly pulsing flow environment there is high BSR variation. High pulsation level and variation in BSR generally has a negative impact on turbine efficiency, because the entering gas alternates between going too fast and too slow for the current blade speed conditions. This results in poor incidence angles between the gas and the blades, as well as other issues that reduce efficiency as one varies from the optimum BSR, as shown in FIG. 18. In FIG. 18, the upper arrow indicates the normalized efficiency that is available from a steady flow at a normalized BSR of 1, and the lower arrow indicates the average normalized efficiency achieved by the turbine when it is exposed to a widely varying BSR. In this case, about 30% of the possible turbine efficiency is lost.

In the combustion turbine engine disclosed herein, the combustion chambers have turbine-like blading internal to the combustion chambers. In the combustion chamber environment, the closed combustion chambers contain hot, high-pressure gas at approximately zero velocity (post-combustion, but before the exhaust ports open). Once the exhaust ports open over a finite period, an exit path for the combustion gases is provided. The flow path begins as a small orifice and grows to full port size before again diminishing to a small orifice as the combustion chambers rotate relative to the fixed port plates. In some embodiments, the exhaust ports (e.g., outlets 176 and/or 101) include a nozzle, directed circumferentially on the combustion turbine such that the exhaust is expelled to create a thrust to rotate the combustion turbine in the desired direction. Without being bound by theory, the acceleration of the discharge from such an exhaust nozzle transmits a forces of equal magnitude to the rotating combustion turbine in the opposite direction; thereby, applying torque to the drive shaft. In some embodiments, energy is also extracted from the exhaust gas of the combustion chambers by an auxiliary turbine positioned at the exit of the combustion chambers.

Scavenging

Scavenging of the combustion chambers includes replacing the combustion products from the previous cycle with fresh air and/or a fuel/air mixture. In some embodiments of the combustion turbine engine disclosed herein, a positive pressure differential from the combustion chamber inlet to the combustion chamber outlet exists, at least during the period that both intake and exhaust ports are open. When both intake and exhaust ports are open at the same time, then a positive pressure differential will push fresh air in and scavenge the combustion products out of the combustion chambers.

In some embodiments, the combustion turbine engine disclosed herein has a positive pressure differential across the combustion chamber to facilitate scavenging and utilizes a high pressure that results from constant volume combustion as the turbine inlet pressure. In some embodiments, combustor outlet pressure is not higher than the compressor discharge pressure. In some such embodiments, exhaust outlets (e.g., nozzles) are positioned at the combustion chamber outlets such that pressure is reduced while gas flow velocity is increased (e.g., into the auxiliary turbine expansion section). In some embodiments, the inlet to the turbine section has a higher pressure or higher flow velocity than the pressure or flow velocity in the high-pressure retention chamber on the inlet side of the combustion chamber.

Power Generation

Without being bound by theory, it is believed that generating power requires the conversion of the chemical energy (e.g., the energy of the gasoline) into mechanical movement (i.e., mechanical energy). To generate electricity, an additional step is required to convert the mechanical energy into electrical current, which is typically accomplished using a rotating generator. Mechanical movement that is used for the purpose of doing work (electrical work or mechanical work) may be provided by a rotating shaft. For example, a typical car engine utilizes linear piston movement to rotate a shaft, while a typical gas turbine engine directly rotates a shaft. Thus, in such engines, power is determined by the rotation speed of the shaft and the torque applied to the shaft.

Figure 19:
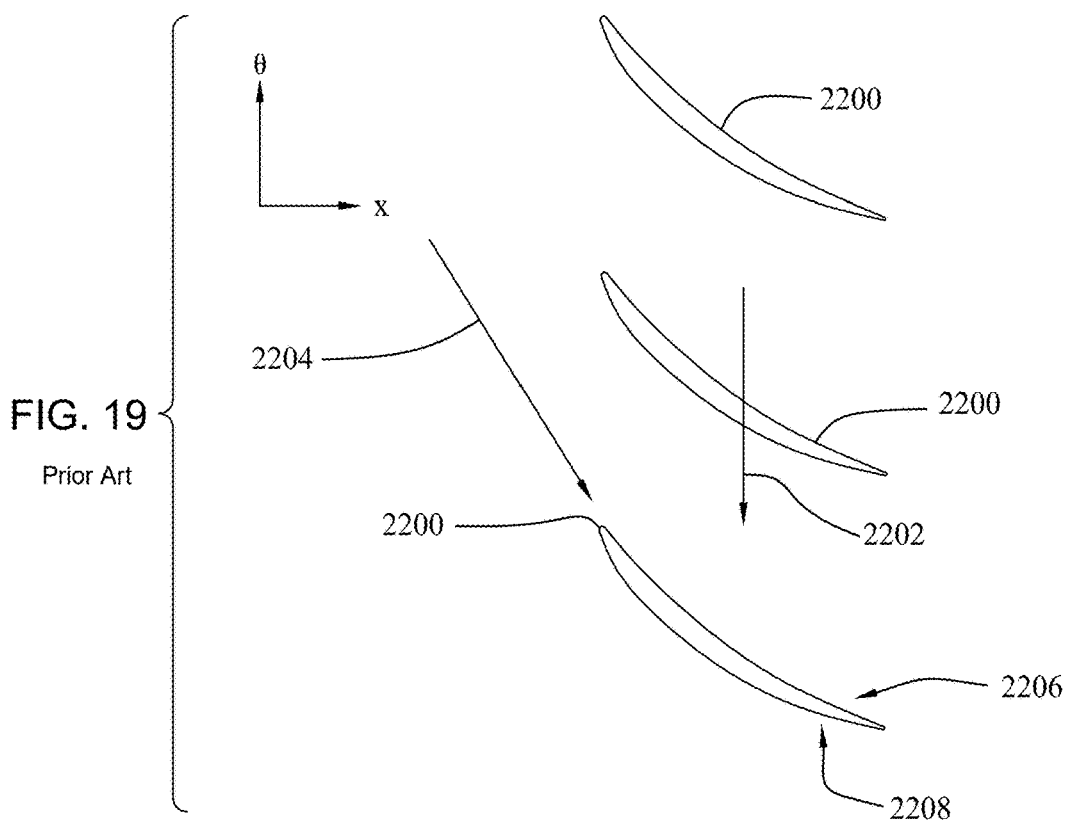
FIG. 19 is a schematic illustrating aerodynamic lift.

In gas turbine engines, the hot section of the turbine (expander) extracts energy from the fluid (i.e., combusted air and fuel) and converts it to mechanical rotation. As shown in FIG. 19, energy is extracted by expanding the high pressure, high temperature fluid 2204 across airfoils 2200 that generate aerodynamic lift 2202. The high-pressure side 2206 and low-pressure side 2208 of airfoil 2200 are also indicated in FIG. 19. The fluid temperature is increased by combustion of the fuel upstream of the expander, which occurs in what is typically called the combustor. In gas turbine engines, combustion takes place while the fluid is at a constant pressure. The primary source of torque is the aerodynamic lift applied to the blades of the turbine. As the turbine blades redirect the flow, the energy in the fluid is transferred into shaft torque. The difference in pressure between the top and bottom sides of the turbine blades is due to the aerodynamic lift generated as fluid moves across the airfoil, which is the source of torque applied to the turbine. Typical gas turbines have separate combustor and expander sections to simplify the gas turbine engine design by having a stationary combustor upstream of the rotating expander stages. After combustion, the energy from the combusted gas is extracted across one or more rotating expander stages, with each stage being composed of both a stationary segment (stator vanes) and a rotating segment (rotor blades).

In some embodiments, the combustion turbine engine disclosed herein combines the stationary combustor and stationary vanes of a gas turbine engine into a single rotating component. Contrary to typical gas turbine engines, in the combustion turbine engine disclosed herein the combustion process occurs at constant volume, while in a typical gas turbine engine the combustion process occurs at constant pressure. By combining the combustor and vanes into a single rotating component, the combustion turbine, the high pressure after combustion can be used to directly apply torque to the rotating drive shaft.

In some embodiments, work is extracted from the curved blades 180 in the high-pressure combustion turbine 152. In some such embodiments, aerodynamic lift from gas flow exiting the combustion turbine 152 generates a torque that is transferred to the drive shaft 104, extracting work from the gas flow.

Figure 20:
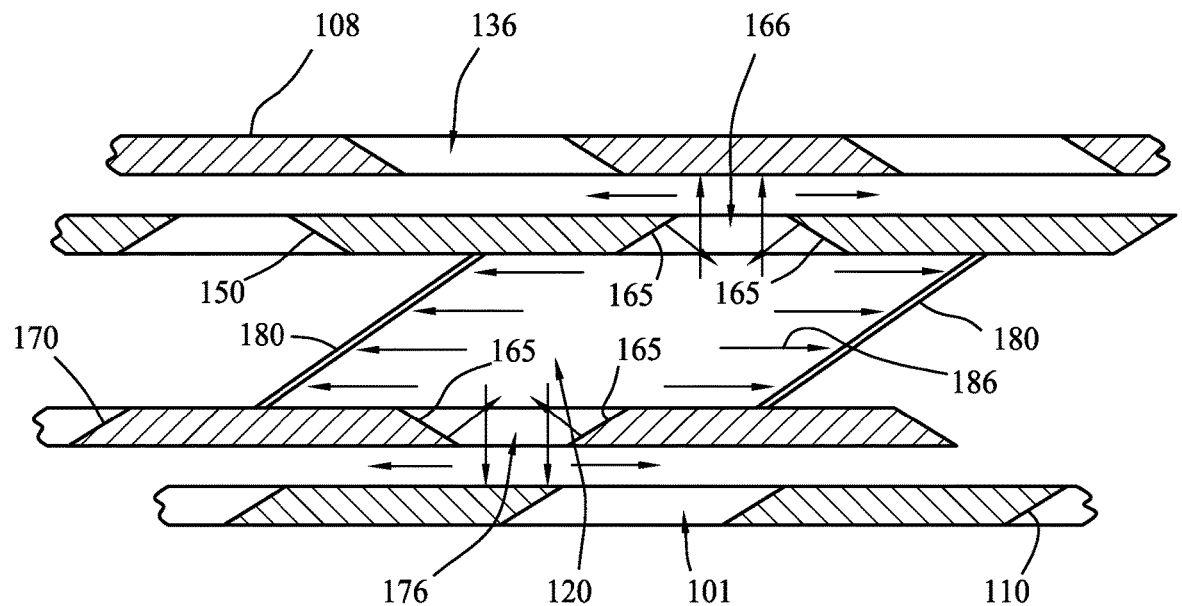
FIG. 20 is a schematic illustrating a combustion event within a combustion chamber.
Figure 21:
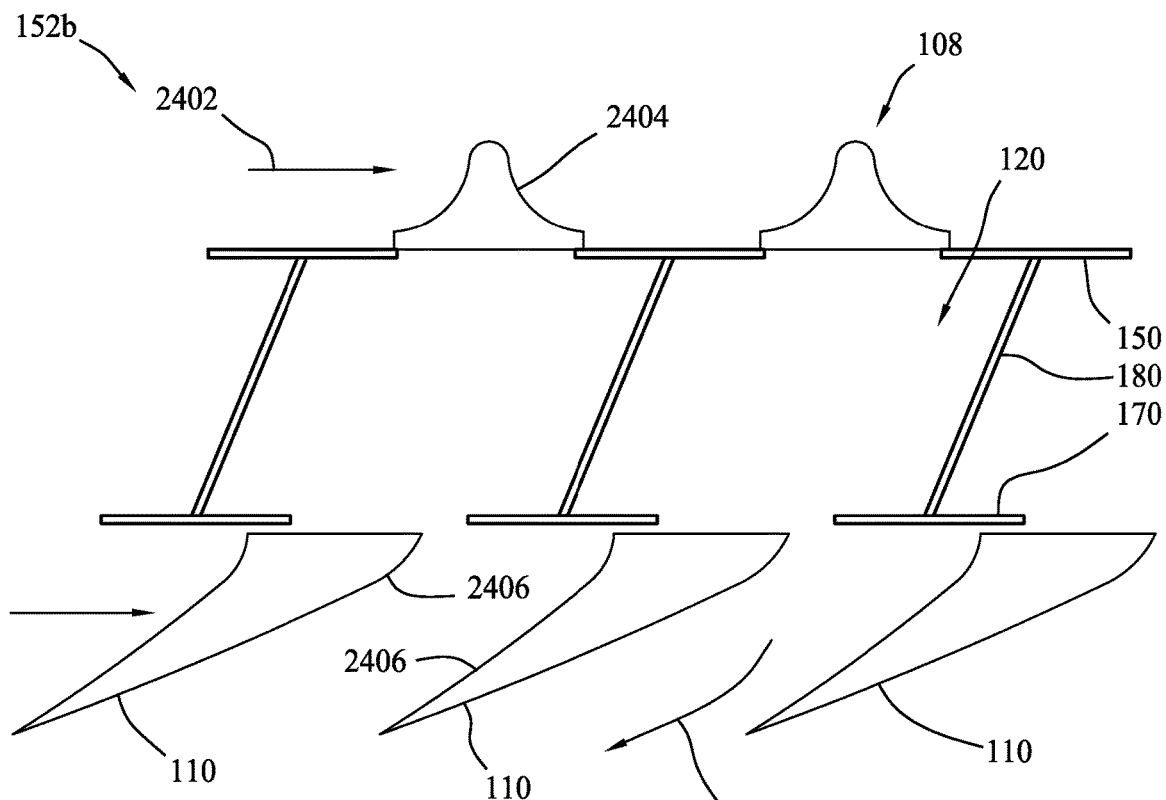
FIG. 21 is a chematic illustrating a stationary combustion chamber with rotaing plates.
Figure 22B:
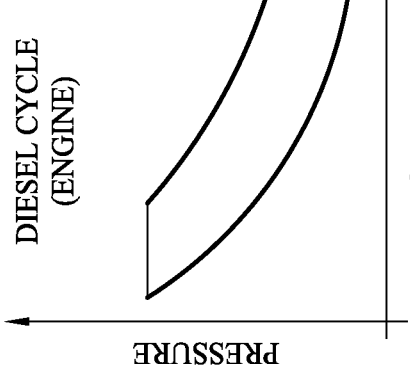
FIGS. 22A-22D are graphs of pressure vs volume for Otto, Diesel, Brayton, and detonation cycles, respectively.
Figure 22D:
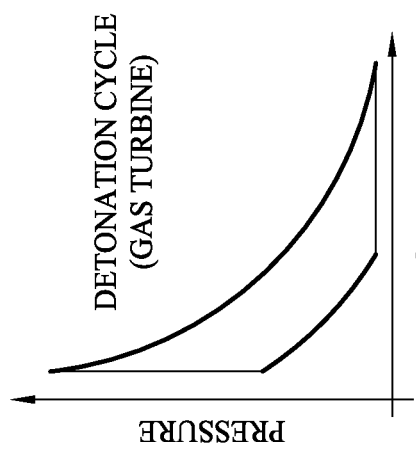
Figure 22A:
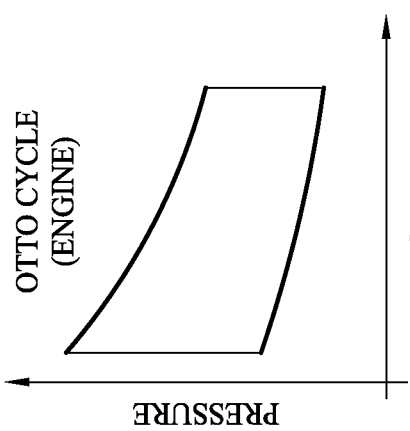
Figure 22C:
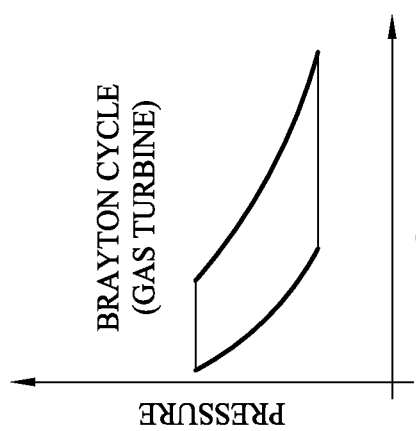

In some embodiments, generating net shaft power from the combustion turbine engine disclosed herein includes transferring the energy from the combusted gas to the rotating components (e.g., the drive shaft 104). FIG. 20 depicts an exemplary combustion event within a combustion chamber. Combustion gases 186 are shown within combustion chamber 120, between walls 180. As shown, top fixed plate 108, top rotation plate 150, bottom rotating plate 170, and bottom fixed plate 110 each include beveled or angled edges 165. Without being bound by theory, beveled edges 165 may reduce or retard the occurrence of leakage of combustion gases 186 from combustion chamber 120 by deflecting exhaust gases 186 into combustion chamber 120. In some such embodiments, to generate net shaft power from the combustion turbine engine, the combustion turbine engine includes an expander stage or a stationary combustor. For example, an additional expander stage (e.g., auxiliary turbine 113) may be positioned downstream of the combustor (combustion chambers 120) to convert the high pressure and high temperature gas into shaft work. As the combustion process of the combustion turbine engine 152 is periodic, a pulsating flow of exhaust gas into the auxiliary turbine 113 may be created. In another exemplary embodiment, the rotating combustion turbine 152 is replaced with a stationary combustor 152b, as shown in FIG. 21. In such an embodiment, the intake end 150 and exhaust end 170 that define the top and bottom of the combustion chambers 120 are stationary or fixed (as opposed to rotating as in FIG. 2), and the top plate 108 and bottom plate 110 are rotating plates (as opposed to stationary or fixed plates as in FIG. 2). As shown in FIG. 21, the geometry of the plates 108 and 110 may be configured to provide aerodynamic thrust in the direction of rotation 2402. For example, plate 108 may include curved surfaces 2402 that, together, define a nozzle that directs air flow into combustion chambers 120 when the intake inlet ports of combustion chambers 120 are opened, and plate 110 may include angled surfaces 2406 that, together, define a nozzle that directs exhaust 186 out of combustion chambers 120 in a direction that causes work extraction to occur due to thrust on a downstream rotating component and rotation of plates 108 and 110 in direction 2402. In such embodiments, plates 108 and 110 may be coupled with the drive shaft (not shown) to drive the drive shaft.

Constant Volume Combustion

The combustion turbine engine disclosed herein provides for a constant-volume combustion while using turbomachinery to compress and expand gas. Constant-volume combustion provides a significant rise in pressure of the combusted gas, which can provide more work than a constant-pressure combustion process. With the attendant rise in pressure during combustion, fewer compression stages may be used; thereby, reducing the overall complexity and size of the engine. With constant-volume combustion, the combustion turbine engine disclosed herein uses a cycle similar to that of a detonation cycle, as shown in FIGS. 22A-22D, where an Otto cycle, diesel cycle, Brayton cycle, and detonation cycle are plotted with pressure vs. volume.

Applications

As would be clear from the forgoing, some embodiments of the present disclosure include the application of air compression concepts to force high-pressure air into aerodynamically shaped rotating combustion chambers. One cycle of energy creating combustion starts when fresh, compressed air loads the rotating combustion chambers. Fuel is injected and ignited as the combustion chambers rotate into a closed configuration. Ignition adds energy to initiate combustion. The bottom of the combustion chambers rotates into an open position first to exhaust the high-temperature, high-pressure combustion gases, which drives the rotation of the chambers, completing the cycle of the engine and results in the pressure inside the combustion chambers to be less than in the high pressure pulsation damper and retention chamber 131 which facilitates scavenging. The rotating chambers connect to a central drive shaft producing shaft work output. The shaft work output of the drive shaft may be harvested for any number of uses, such as to drive the wheels of a vehicle or to move components of another machine.

In some embodiments, the combustion turbine engine disclosed herein may be used in applications where piston engines are typically used, such as in motor vehicles. In other embodiments, the combustion turbine engine disclosed herein may be used in applications where conventional gas turbine engines are typically used. In some embodiments, the combustion turbine engine disclosed herein may be used in applications where turbojet engines are used to produce thrust, used in applications where turbofan engines are used to power a ducted fan that provides thrust, or used in applications where turboprop engines are used to power a propeller.

In some applications, the combustion turbine engine disclosed herein may be used to drive a shaft that turns an electrical generator to create power, or to drive a shaft that turns a propeller shaft of a ship. Thus, the combustion turbine engine disclosed herein may be incorporated into motor vehicles (cars, trucks), boats, and aircraft.

Hybrid Power Generation

In some applications, the combustion turbine engine disclosed herein may be used in conjunction with renewable energy sources, such as wind and solar, to provide power when wind or solar energy is not available. In such embodiments, the engine disclosed herein may have a relatively short start up time, and may operate efficiently, with relatively low emissions at part load. Additionally, due to the air-fuel mixture combustion event occurring in a constant volume process that does not have the typical turbine combustor requirements for flame-holding, the engine disclosed herein may be more efficient over a wider operating range than a conventional gas turbine.

Combined Heat and Power and Hydrogen Economy

In some applications, the combustion turbine engine disclosed herein may be used in a combined heat and power (CHP) system. CHP refers to systems and process cycles that use an engine for both power generation of mechanical (e.g., shaft) or electrical energy and for the heat produced from the exhaust. Some processes where a CHP may be useful include chemical processing, textile, and the paper and pulp industries. Some such chemical processes produce hydrogen, which, in some embodiments, is the preferred fuel for a CHP because the hydrogen is available at the site and/or because the hydrogen is a product of the process. With the constant volume combustion of the presently disclosed engine, and with a lack of a pilot flame that could be extinguished, the combustion turbine engine disclosed herein may be incorporated into a CHP and may use fuel mixtures that contain relatively high hydrogen content. For some installations, the location of the engine may require the use of locally available or produced natural gas or other fuels from the particular industrial process. Thus, the ability to use hydrogen or methane or other locally available fuels provides the presently disclosed engine with the ability to be used in remote locations.

Micro Turbines

Conventional turbomachinery can typically be scaled down to about a 1 MW-scale without significant effects on efficiency, manufacturability, and mechanical design. At scales that are smaller than 1 MW, however, conventional turbomachinery may exhibit leakage paths, accounting for greater percentages of the aerodynamic flow area as the flow path is scaled down to smaller sizes. The combustors of conventional turbomachinery need to be large enough to provide sufficient residence time for complete combustion. In some embodiments of the presently disclosed combustion turbine engine, the use of a constant volume combustion process reduces limitations on residence time and allows for smaller combustors for micro-gas turbines than would be achievable using conventional turbomachinery. In some embodiments, the combustor and expander are on a single compressor wheel, with the combustor positioned on an impeller.

High Speed Air-Breathing Propulsion

Aircraft, such as aircraft designed faster than the speed of sound, typically include a turbojet engine or a low bypass-ratio turbofan. One limiting factor to flying faster than about Mach three is the sensitivity of the combustor to high-flow velocity. Constant-pressure combustion processes used in conventional aircraft engines require air to be compressed and slowed to a subsonic velocity (e.g., Mach <1) such that the combustor size is appropriate for the required combustion residence time and so that flame-out conditions of the combustor pilot flame are avoided. In some embodiments, the combustion turbine engine disclosed herein does not require a pilot flame. In some embodiments, the combustion turbine disclosed herein can be incorporated into a turbojet or turbofan of an aircraft.

Other Engine Configurations

In some embodiments, the combustion turbine engine disclosed herein is incorporated into a propeller driven aircraft to drive the propeller. In some such embodiments, the combustion turbine engine does not include a turbocharge in the exhaust stream, and the air flow from the propeller provides an initial flow of fresh air into the rotating combustion turbine.

In some embodiments, the combustion turbine disclosed herein is incorporated into a jet and turbine engines, with low-pressure and high-pressure fans that supply compression to the feed air.

As shown in FIG. 2, in some embodiments ambient air enters at the turbine end, or hot end, of the combustion turbine engine disclosed herein, with preliminary compression occurring in a turbocharger or supercharger. The air is then transferred to the other end of the engine, where it passes through a high-pressure compressor stage before entering the combustion turbine. In other embodiments, the intake air flows directly into the compressor end, cold end, of the engine and passes through multiple stages of compression before entering the combustion chambers of the combustion turbine.

EMBODIMENTS

Embodiment 1

A combustion turbine engine, the engine comprising: an air intake; a combustion turbine, the combustion turbine comprising: a shroud and turbine blades coupled to or integral with the shroud, wherein the turbine blades are positioned within the shroud, and wherein space between adjacent turbine blades at least partially define combustion chambers; an intake end comprising intake inlets into the combustion chambers and an exhaust end comprising exhaust outlets out of the combustion chambers; a drive shaft, wherein the combustion turbine is coupled with the drive shaft such that rotation of the combustion turbine rotates the drive shaft; a top fixed plate comprising intake inlets positioned adjacent the intake end, and a bottom fixed plate comprising exhaust outlets positioned adjacent the exhaust end, wherein the combustion turbine is positioned between the top and bottom fixed plates; and wherein the combustion turbine is rotatable relative to the top fixed plate to allow passage of intake air into the combustion chambers through the intake inlets, and is rotatable relative to the bottom fixed to exhaust combustion gases through the exhaust outlets.

Embodiment 2

The engine of embodiment 1, further comprising one or more air compressors positioned between the air intake and the top fixed plate, the one or more air compressors positioned to receive intake air from the air intake and provide pressurized intake air to the combustion turbine.

Embodiment 3

The engine of embodiment 2, further comprising a turbocharger, a supercharger, or a twincharger positioned between the air intake and the one or more air compressors, and position to receive intake air from the air intake and provide intake air to the one or more air compressors.

Embodiment 4

The engine of embodiment 2 or 3, wherein the one or more air compressors include two air compressors arranged in series.

Embodiment 5

The engine of any of embodiments 1 to 4, further comprising an auxiliary turbine positioned in an exhaust stream of the combustion turbine, downstream of the bottom fixed plate.

Embodiment 6

The engine of embodiment 5, wherein the auxiliary turbine is coupled with the drive shaft.

Embodiment 7

The engine of any of embodiments 2 to 6, further comprising an air pressurization nozzle positioned between the one or more air compressors and the combustion turbine, the air pressurization nozzle positioned to direct intake air into the combustion turbine.

Embodiment 8

The engine of any of embodiments 1 to 7, further comprising at least one fuel injector positioned to inject fuel into the combustion chambers.

Embodiment 9

The engine of any of embodiments 1 to 8, further comprising at least one ignition apparatus positioned to ignite a fuel and air mixture within the combustion chambers.

Embodiment 10

The engine of any of embodiments 1 to 9, further comprising air cooling holes, within the top fixed plate, the bottom fixed plate, the combustion turbine body, or combinations thereof.

Embodiment 11

The engine of any of embodiments 1 to 10, wherein the combustion turbine comprises blast nibs on the body thereof.

Embodiment 12

The engine of any of embodiments 1 to 11, further comprising a bearing positioned between the top fixed plate and the drive shaft and a bearing positioned between the bottom fixed plate and the drive shaft.

Embodiment 13

The engine of any of embodiments 1 to 12, further comprising rings positioned between the top fixed plate and the intake end of the combustion turbine, and between the bottom fixed plate and the exhaust end of the combustion turbine.

Embodiment 14

The engine of any of embodiments 1 to 13, wherein the drive shaft is coupled with a component, and wherein the drive shaft drives the component.

Embodiment 15

The engine of embodiment 14, wherein the drive shaft is coupled with a first component at a first end of the drive shaft, and is coupled with a second component at a second end of the drive shaft.

Embodiment 16

The engine of embodiment 14 or 15, wherein the component comprises a propeller, a pump, a generator, a turbine, a compressor, or a wheel.

Embodiment 17

The engine of any of embodiments 1 to 16, wherein the air intake is positioned such that intake air is heated by exhaust of the engine prior to passing into the combustion turbine.

Embodiment 18

The engine of any of embodiments 1 to 17, further comprising a mixing zone wherein intake air is mixed with fuel upstream of the combustion turbine.

Embodiment 19

The engine of any of embodiments 1 to 18, further comprising an exterior cylinder that at least partially defines a housing of the engine.

Embodiment 20

The engine of any of embodiments 2 to 19, wherein each air compressor is coupled with and driven by the drive shaft.

Embodiment 21

The engine of any of embodiments 1 to 20, wherein the combustion turbine functions as a flywheel.

Embodiment 22

The engine of any of embodiments 1 to 21, wherein, through a cycle of the engine, the combustion turbine rotates to sequentially enter the following positions: a first position wherein the exhaust outlets of the combustion turbine are not aligned with the exhaust outlets in the bottom fixed plate such that exhaust is prevented from escaping the combustion chambers, and the intake inlets in the combustion turbine are partially aligned with the intake inlets in the top fixed plate such that gas is capable of flowing into the combustion chambers; a second position wherein the intake inlets of the combustion turbine are not aligned with the intake inlets of the top fixed plate, and the exhaust outlets of the combustion turbine are not aligned with the exhaust outlets of the bottom fixed plate, such that gas is prevented from entering or exiting the combustion chambers; a third position wherein the intake inlets of the combustion turbine are not aligned with the openings in the top fixed plate such that gas is prevented from entering the combustion chambers, and the exhaust outlets of the combustion turbine are at least partially aligned with the exhaust outlets of the bottom fixed plate, such that exhaust gas exits the combustion chambers; and a fourth position wherein the intake inlets of the combustion turbine are at least partially aligned with the openings in the top fixed plate such that air is allowed to flow into the combustion chambers, and the exhaust outlets of the combustion turbine are at least partially aligned with the openings of the bottom fixed plate such that exhaust gas exits the combustion chambers.

Embodiment 23

A combustion turbine engine, the engine comprising: an air intake; a stationary combustor, the stationary combustor comprising: a shroud and combustion chamber walls coupled to or integral with the shroud, wherein the combustion chamber walls are positioned within the shroud, and wherein space between adjacent combustion chamber walls at least partially define combustion chambers; an intake end comprising intake inlets into the combustion chambers and an exhaust end comprising exhaust outlets out of the combustion chambers; a top plate comprising intake inlets positioned adjacent the intake end, and a bottom plate comprising exhaust outlets positioned adjacent the exhaust end, wherein the stationary combustor is positioned between the top and bottom plates, wherein the top plate includes intake inlets to direct intake air into the combustion chambers and the bottom plate includes exhaust outlets positioned to direct exhaust out of the combustion chambers circumferentially about the stationary combustor to create thrust to rotate the top and bottom plates; a drive shaft, wherein the top and bottom plates are coupled with the drive shaft such that rotation of the top and bottom plates rotates the drive shaft; wherein the top and bottom plates are rotatable relative to the stationary combustor to allow passage of intake air into the combustion chambers through the intake inlets and to exhaust combustion gases through the exhaust outlets.

Embodiment 24

A method of generating motive force using a combustion turbine engine, the method comprising: providing fuel and intake air into an intake end of combustion chambers, wherein the combustion chambers are at least partially defined by space between blades of a combustion turbine, wherein the blades are coupled with a drive shaft; closing the intake end and an exhaust end of the combustion chambers and combusting the fuel and intake air mixture within the closed combustion chambers, wherein the combusting forms combustion gases; and opening the exhaust end of the combustion chambers and exhausting the combustion gases from the combustion chambers, wherein exhausting the combustion gases drives rotation of the blades, and wherein rotation of the blades drives rotation of the drive shaft.

Embodiment 25

The method of embodiment 24, further comprising, prior to providing the intake air into the combustion chambers, passing the intake air through a turbocharger, a supercharger, or a twincharger.

Embodiment 26

The method of claim 24 or 25, further comprising, prior to providing the intake air into the combustion chambers, compressing the intake air.

Embodiment 27

The method of any of embodiments 24 to 26, further comprising directing the intake air into the combustion chambers through an air pressurization nozzle.

Embodiment 28

The method of any of embodiments 24 to 27, further comprising mixing the fuel and intake air prior to prior to providing the fuel and intake air into the combustion chambers.

Embodiment 29

The method of any of embodiments 24 to 28, further comprising passing the exhausted combustion gases through an auxiliary turbine downstream of the combustion chambers, wherein the auxiliary turbine is coupled with the drive shaft.

Embodiment 30

The method of any of embodiments 24 to 29, wherein the combustion turbine is positioned between a top fixed plate and a bottom fixed plate of the combustion turbine engine such that the intake end is positioned adjacent the top fixed plate and the exhaust end is positioned adjacent the bottom fixed plate, wherein the top fixed plate includes intake inlets and the bottom fixed plate includes exhaust outlets, wherein opening the intake end of the combustion turbine includes rotating the combustion turbine such that the intake inlets are in fluid communication with the combustion chambers, and wherein opening the exhaust end of the combustion turbine includes rotating the combustion turbine such that the exhaust outlets are in fluid communication with the combustion chambers.

Embodiment 31

The method of any of embodiments 24 to 30, wherein a cycle of the combustion turbine engine at least includes: a first state, wherein the exhaust end of the combustion chambers is closed and the intake end of the combustion chambers is at least partially open, wherein intake air is provided into the combustion chambers; a second state, wherein the combustion chambers are closed and the fuel and intake air mixture is combusted; a third state, wherein the exhaust end of the combustion chambers is at least partially open while the intake end of the combustion chambers is closed, and wherein combustion gases are exhausted from the combustion chambers; and a fourth state, wherein the intake end and the exhaust end of the combustion chambers are both at least partially open, wherein combustion gases are exhausted from the combustion chambers and wherein scavenging of the combustion chambers occurs.

Embodiment 32

The method of any of embodiments 24 to 31, wherein combustion within the combustion chambers occurs within a constant volume.

Embodiment 33

A method of generating motive force using a combustion turbine engine, the method comprising: providing fuel and intake air into an intake end of combustion chambers, wherein the combustion chambers are at least partially defined by space between blades of a stationary combustor; closing the intake end and an exhaust end of the combustion chambers and combusting the fuel and intake air mixture within the closed combustion chambers, wherein the combusting forms combustion gases; and opening the exhaust end of the combustion chambers and exhausting the combustion gases from the combustion chambers; wherein the stationary combustor is positioned between a top plate and a bottom plate of the combustion turbine engine, the top plate including intake inlets positioned adjacent the intake end and the bottom plate including exhaust outlets positioned adjacent the exhaust end, wherein the top plate includes intake inlets positioned to direct intake air into the combustion chambers and the bottom plate includes exhaust outlets positioned to direct exhaust out of the combustion chambers circumferentially about the stationary combustor to create thrust on a downstream component to rotate the top and bottom plates; wherein the top and bottom plates are coupled with a drive shaft such that rotation of the top and bottom plates rotates the drive shaft, and wherein the top and bottom plates are rotatable relative to the stationary combustor to allow passage of intake air into the combustion chambers through the intake inlets and to exhaust combustion gases through the exhaust outlets.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A combustion engine, the engine comprising:
a combustor comprising a shroud and a plurality of constant volume combustion chambers within the shroud, the plurality of constant volume combustion chambers having an intake end and an exhaust end and curved combustion chamber walls, and wherein each constant volume combustion chamber is defined by a space that extends between the intake and exhaust ends of the combustor;
an inlet coupled with the intake end and an outlet coupled with the exhaust end, wherein the combustor has an axis of rotation extending from the intake end to the exhaust end, and wherein, through each cycle of the combustor, the combustor is rotatable relative to the inlet to a position wherein the inlet is simultaneously in fluid communication with each and all of the plurality of constant volume combustion chambers, and wherein the combustor is rotatable relative to the outlet to a position wherein the outlet is simultaneously in fluid communication with each and all of the plurality of constant volume combustion chambers;

a drive shaft coupled with the combustor, wherein the drive shaft extends through the combustor such that a first end of the drive shaft extends from the exhaust end of the combustor and a second end of the drive shaft extends from the intake end of the combustor;

a first component coupled with the first end of the drive shaft such that the outlet is positioned between the first component and the combustor, and a first air compressor coupled with the second end of the drive shaft such that the inlet is positioned between the first air compressor and the combustor;

wherein combustion within the plurality of constant volume combustion chambers is simultaneous and wherein simultaneous exhaust of the combustion gases from all of the plurality of constant volume combustion chambers through the exhaust end and outlet imparts thrust force on the curved combustion chamber walls to drive rotation of the combustor in a single direction of rotation about the axis of rotation, wherein an entirety of the combustor, from the intake end and inlet to the exhaust end and outlet, rotates in the single direction throughout the cycle of the combustor, and wherein the rotation of the combustor drives rotation of the drive shaft, wherein rotation of the drive shaft drives the first component and the first air compressor;

wherein the combustor is engaged with the inlet and the outlet and extends from the inlet to the outlet such that the space of each constant volume combustion chamber extends has an extent that spans from the intake end and inlet to the exhaust end and outlet.

2. A combustion turbine engine, the engine comprising:
a top fixed plate comprising plate intake inlets;
a bottom fixed plate comprising exhaust outlets out of the bottom fixed plate;
a combustion turbine positioned between the top and bottom fixed plates, wherein the combustion turbine includes a shroud, turbine blades within the shroud, and a plurality of constant volume combustion chambers, wherein each constant volume combustion chamber has curved combustion chamber walls defined by the turbine blades, wherein each constant volume combustion chamber is defined by a space between adjacent turbine blades that has an extent that spans from the top fixed plate to the bottom fixed plate;
wherein the combustion turbine has an intake end and an exhaust end, wherein the top fixed plate is coupled with the combustion turbine at the intake end, wherein the bottom fixed plate is coupled with the combustion turbine at the exhaust end, wherein each of the constant volume combustion chambers has a chamber inlet at the intake end of the combustion turbine and a chamber outlet at the exhaust end of the combustion turbine such that an extent of each constant volume combustion chamber spans from the top fixed plate at the intake end to the bottom fixed plate at the exhaust end;

a drive shaft coupled with the combustion turbine;
a first component coupled with a first end of the drive shaft such that the bottom fixed plate is positioned between the first component and the combustion turbine;
a first air compressor coupled with the second end of the drive shaft such that the top fixed plate is positioned between the first air compressor and the combustion turbine;
wherein, through each cycle of the combustion turbine engine: the combustion turbine is rotatable relative to the top fixed plate to a position where all of the plate intake inlets of the top fixed plate are positioned to allow passage of intake air simultaneously into all of the plurality of constant volume combustion chambers through all of the chamber inlets, the combustion turbine is rotatable relative to the top and bottom fixed plates to a position where constant volume combustion occurs simultaneously in all of the plurality of constant volume combustion chambers, and the combustion turbine is rotatable relative to the bottom fixed plate to a position to allow exhaust of combustion gases simultaneously from all of the plurality of constant volume combustion chambers through the chamber outlets and the exhaust outlets of the bottom fixed plate; and
wherein the curved combustion chamber walls are shaped such that thrust forces of combustion gases imparted on the curved combustion chamber walls during combustion and during exhaust of combustion gases through the chamber outlets and the exhaust outlets drive rotation of an entirety of the combustion turbine, from the intake end to the exhaust end and between the top and bottom fixed plates, in a single direction of rotation about an axis of rotation of the combustion turbine, and wherein the entirety of the combustion turbine, from the intake end to the exhaust end and from the top fixed plate to the bottom fixed plate, rotates in the single direction throughout the cycle of the combustion turbine engine; and
wherein rotation of the combustion turbine in the single direction throughout the cycle of the combustion turbine engine drives rotation of the drive shaft about an axis of rotation of the drive shaft, wherein rotation of the drive shaft drives the first component, and wherein rotation of the drive shaft drives the first air compressor.

3. The engine of claim 2, the engine further comprising:
an air intake at the intake end of the combustion turbine;
wherein the exhaust end of the combustion turbine is opposite the intake end;
wherein the axis of rotation of the combustion turbine extends from the intake end to the exhaust end;
wherein the drive shaft extends through the combustion turbine such that the first end of the drive shaft extends from the exhaust end of the combustion turbine and the second end of the drive shaft extends from the intake end of the combustion turbine.

4. The engine of claim 3, further comprising an auxiliary turbine positioned in an exhaust stream of the combustion turbine, downstream of the bottom fixed plate.

5. The engine of claim 4, wherein the auxiliary turbine is coupled with the drive shaft, and wherein the auxiliary turbine drives rotation of the drive shaft.

6. The engine of claim 3, further comprising at least one fuel injector positioned to inject fuel into each of the combustion chambers.

7. The engine of claim 3, further comprising at least one ignition apparatus positioned to ignite a fuel and air mixture within each of the combustion chambers.

8. The engine of claim 3, further comprising air cooling holes within the top fixed plate.

9. The engine of claim 3, further comprising a bearing positioned between the top fixed plate and the drive shaft and a bearing positioned between the bottom fixed plate and the drive shaft.

10. The engine of claim 3, further comprising rings and blast nibs positioned between the top fixed plate and the intake end of the combustion turbine, and between the bottom fixed plate and the exhaust end of the combustion turbine.

11. The engine of claim 3, further comprising an exterior cylinder that at least partially defines a housing of the engine.

12. The engine of claim 3, wherein the combustion turbine functions as a flywheel.

13. The engine of claim 3, wherein, through each cycle of the engine, the combustion turbine rotates to sequentially enter the following positions:
  a first position wherein all of the chamber outlets of the combustion turbine are not aligned with any of the exhaust outlets in the bottom fixed plate such that exhaust is prevented from escaping any of the plurality of constant volume combustion chambers, and all of the chamber inlets in the combustion turbine are at least partially aligned with the plate intake inlets in the top fixed plate such that gas is capable of simultaneously flowing into all of the plurality of constant volume combustion chambers;
  a second position wherein all of the chamber inlets of the combustion turbine are not aligned with any of the plate intake inlets of the top fixed plate, and all of the chamber outlets of the combustion turbine are not aligned with any of the exhaust outlets of the bottom fixed plate, such that gas is prevented from entering or exiting any of the plurality of constant volume combustion chambers;
  a third position wherein all of the chamber inlets of the combustion turbine are not aligned with any of the plate intake inlets of the top fixed plate such that gas is prevented from entering any of the plurality of constant volume combustion chambers, and all of the chamber outlets of the combustion turbine are at least partially aligned with the exhaust outlets of the bottom fixed plate, such that exhaust gas simultaneously exits all of the plurality of constant volume combustion chambers; and
  a fourth position wherein all of the chamber inlets of the combustion turbine are at least partially aligned with the plate intake inlets of the top fixed plate such that air is allowed to simultaneously flow into all of the plurality of constant volume combustion chambers, and all of the chamber outlets of the combustion turbine are at least partially aligned with the exhaust outlets of the bottom fixed plate such that exhaust gas simultaneously exits all of the plurality of constant volume combustion chambers.

14. The engine of claim 3, wherein the first air compressor is coupled with the second end of the drive shaft upstream of the intake end of the combustion turbine.

15. The engine of claim 14, further comprising a second air compressor coupled with the second end of the drive shaft, wherein rotation of the drive shaft drives the second air compressor, wherein the first and second air compressors are positioned between the air intake and the top fixed plate, wherein the first and second air compressors are positioned to receive intake air from the air intake and provide pressurized intake air to the combustion turbine, wherein the first and second air compressors are arranged in series, and wherein the first air compressor is a low-pressure air compressor and the second compressor is a high-pressure air compressor downstream of the low-pressure air compressor.

16. The engine of claim 15, further comprising an air pressurization nozzle positioned between the first and second air compressors and the combustion turbine, the air pressurization nozzle positioned to direct intake air into the combustion turbine.

17. The engine of claim 2,
  wherein the drive shaft extends through the combustion turbine such that the first end of the drive shaft extends from the exhaust end of the combustion turbine and the second end of the drive shaft extends from the intake end of the combustion turbine.

18. The engine of claim 17, wherein the first air compressor is a low-pressure air compressor and further comprising a second air compressor that is a high-pressure air compressor arranged in series with the first air compressor and positioned between an air intake and the combustion chamber intake inlets, wherein the first and second air compressors are positioned to provide pressurized intake air into the combustion chambers.

19. The engine of claim 17, further comprising an auxiliary turbine positioned in an exhaust stream of the combustion turbine, wherein the auxiliary turbine is coupled with the drive shaft.

* * * * *